(12) United States Patent
Law et al.

(10) Patent No.: US 7,061,502 B1
(45) Date of Patent: Jun. 13, 2006

(54) METHOD AND APPARATUS FOR PROVIDING LOGICAL COMBINATION OF N ALPHA OPERATIONS WITHIN A GRAPHICS SYSTEM

(75) Inventors: Patrick Y. Law, Milpitas, CA (US); Yoshitaka Yasumoto, Osaka (JP)

(73) Assignee: Nintendo Co., Ltd., Kyoto (JP)

(*) Notice: Subject to any disclaimer, the term of this patent is extended or adjusted under 35 U.S.C. 154(b) by 424 days.

(21) Appl. No.: 09/726,212

(22) Filed: Nov. 28, 2000

Related U.S. Application Data

(60) Provisional application No. 60/226,915, filed on Aug. 23, 2000, provisional application No. 60/226,888, filed on Aug. 23, 2000.

(51) Int. Cl.
G09G 5/02 (2006.01)

(52) U.S. Cl. .................. 345/592; 345/589; 345/591; 345/593

(58) Field of Classification Search ............... 345/589, 345/591, 592, 593
See application file for complete search history.

(56) References Cited

U.S. PATENT DOCUMENTS

| | | | |
|---|---|---|---|
| 4,275,413 A | 6/1981 | Sakamoto et al. |
| 4,357,624 A | 11/1982 | Greenberg |
| 4,463,380 A | 7/1984 | Hooks, Jr. |
| 4,491,836 A | 1/1985 | Collmeyer et al. |
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,653,012 A | 3/1987 | Duffy et al. |
| 4,692,880 A | 9/1987 | Merz et al. |
| 4,695,943 A | 9/1987 | Keeley et al. |
| 4,710,876 A | 12/1987 | Cline et al. |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,452 A | 5/1989 | Kang et al. |
| 4,833,601 A | 5/1989 | Barlow et al. |
| 4,855,934 A | 8/1989 | Robinson |
| 4,888,712 A | 12/1989 | Barkans et al. |
| 4,897,806 A | 1/1990 | Cook et al. |
| 4,907,174 A | 3/1990 | Priem |
| 4,918,625 A | 4/1990 | Yan |
| 4,935,879 A | 6/1990 | Ueda |
| 4,965,751 A | 10/1990 | Thayer et al. |

(Continued)

FOREIGN PATENT DOCUMENTS

EP  0 637 813 A2  2/1995

(Continued)

OTHER PUBLICATIONS

"RenderMan Interface Specification Version 3.1," Pixar Animation Studios (Sep. 1989).

(Continued)

*Primary Examiner*—Matthew C. Bella
*Assistant Examiner*—Tam Tran
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. Logical combination of N alpha compares can be used to provide a wide range of imaging effects including but not limited to cartoon outlining.

10 Claims, 20 Drawing Sheets

U.S. PATENT DOCUMENTS

| | | |
|---|---|---|
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 4,996,666 A | 2/1991 | Duluk, Jr. |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,144,291 A | 9/1992 | Nishizawa |
| 5,163,126 A | 11/1992 | Einkauf et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,293,235 A | 3/1994 | Guede et al. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,506,604 A | 4/1996 | Nally et al. |
| 5,535,288 A | 7/1996 | Chen et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,572,634 A | 11/1996 | Duluk, Jr. |
| 5,573,402 A | 11/1996 | Gray |
| 5,574,835 A | 11/1996 | Duluk, Jr. et al. |
| 5,579,456 A | 11/1996 | Cosman |
| 5,586,234 A | 12/1996 | Sakuraba et al. |
| 5,593,350 A | 1/1997 | Bouton et al. |
| 5,596,686 A | 1/1997 | Duluk, Jr. |
| 5,600,763 A | 2/1997 | Greene et al. |
| 5,606,650 A | 2/1997 | Kelley et al. |
| 5,607,157 A | 3/1997 | Nagashima |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,669,010 A | 9/1997 | Duluk, Jr. |
| 5,678,037 A | 10/1997 | Osugi et al. |
| 5,682,522 A | 10/1997 | Huang et al. |
| 5,684,941 A * | 11/1997 | Dye ........................... 345/441 |
| 5,687,304 A | 11/1997 | Kiss |
| 5,691,746 A | 11/1997 | Shyu |
| 5,694,143 A | 12/1997 | Fielder et al. |
| 5,696,892 A | 12/1997 | Redmann et al. |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,724,561 A | 3/1998 | Tarolli et al. |
| 5,726,689 A | 3/1998 | Negishi et al. |
| 5,726,947 A | 3/1998 | Yamazaki et al. |
| 5,734,386 A | 3/1998 | Cosman |
| 5,739,819 A | 4/1998 | Bar-Nahum |
| 5,740,343 A | 4/1998 | Tarolli et al. |
| 5,740,383 A | 4/1998 | Nally et al. |
| 5,740,406 A | 4/1998 | Rosenthal et al. |
| 5,742,749 A | 4/1998 | Foran et al. |
| 5,742,788 A | 4/1998 | Priem et al. |
| 5,745,118 A | 4/1998 | Alcorn et al. |
| 5,745,125 A | 4/1998 | Deering et al. |
| 5,748,199 A | 5/1998 | Palm |
| 5,748,986 A | 5/1998 | Butterfield et al. |
| 5,751,291 A | 5/1998 | Olsen et al. |
| 5,751,292 A | 5/1998 | Emmot |
| 5,751,295 A | 5/1998 | Becklund et al. |
| 5,751,930 A | 5/1998 | Katsura et al. |
| 5,754,191 A | 5/1998 | Mills et al. |
| 5,757,382 A | 5/1998 | Lee |
| 5,760,783 A | 6/1998 | Migdal et al. |
| 5,764,228 A | 6/1998 | Baldwin |
| 5,764,237 A | 6/1998 | Kaneko |
| 5,767,856 A | 6/1998 | Peterson et al. |
| 5,767,858 A | 6/1998 | Kawase et al. |
| 5,768,629 A | 6/1998 | Wise et al. |
| 5,777,623 A | 7/1998 | Small |
| 5,781,927 A | 7/1998 | Wu et al. |
| 5,791,994 A | 8/1998 | Hirano et al. |
| 5,801,711 A | 9/1998 | Koss et al. |
| 5,801,720 A | 9/1998 | Norrod et al. |
| 5,805,175 A | 9/1998 | Priem |
| 5,808,619 A | 9/1998 | Choi et al. |
| 5,808,630 A | 9/1998 | Pannell |
| 5,809,219 A | 9/1998 | Pearce et al. |
| 5,809,278 A | 9/1998 | Watanabe et al. |

| | | | | | |
|---|---|---|---|---|---|
| 5,815,165 A | 9/1998 | Blixt | 5,963,220 A | 10/1999 | Lee et al. |
| 5,818,456 A | 10/1998 | Cosman et al. | 5,966,134 A | 10/1999 | Arias |
| 5,819,017 A | 10/1998 | Akeley et al. | 5,977,977 A | 11/1999 | Kajiya et al. |
| 5,821,940 A | 10/1998 | Morgan et al. | 5,977,979 A | 11/1999 | Clough et al. |
| 5,822,516 A | 10/1998 | Krech, Jr. | 5,977,984 A | 11/1999 | Omori |
| 5,828,382 A | 10/1998 | Wilde | 5,977,987 A | 11/1999 | Duluk, Jr. |
| 5,828,383 A | 10/1998 | May et al. | 5,982,376 A | 11/1999 | Abe et al. |
| 5,828,907 A | 10/1998 | Wise et al. | 5,982,390 A | 11/1999 | Stoneking et al. |
| 5,831,624 A | 11/1998 | Tarolli et al. | 5,986,659 A | 11/1999 | Gallery et al. |
| 5,831,625 A | 11/1998 | Rich et al. | 5,986,663 A | 11/1999 | Wilde |
| 5,831,640 A | 11/1998 | Wang et al. | 5,986,677 A | 11/1999 | Jones et al. |
| 5,835,096 A | 11/1998 | Baldwin | 5,987,567 A | 11/1999 | Rivard et al. |
| 5,835,792 A | 11/1998 | Wise et al. | 5,990,903 A | 11/1999 | Donovan |
| 5,838,334 A | 11/1998 | Dye | 5,995,120 A | 11/1999 | Dye |
| 5,844,576 A | 12/1998 | Wilde et al. | 5,995,121 A | 11/1999 | Alcokrn |
| 5,850,229 A | 12/1998 | Edelsbrunner et al. | 5,999,189 A | 12/1999 | Kajiya et al. |
| 5,852,451 A | 12/1998 | Cox et al. | 5,999,198 A | 12/1999 | Horan et al. |
| 5,856,829 A | 1/1999 | Gray, III et al. | 6,002,407 A | 12/1999 | Fadden |
| 5,859,645 A | 1/1999 | Latham | 6,002,410 A | 12/1999 | Battle |
| 5,861,888 A | 1/1999 | Dempsey | 6,005,582 A | 12/1999 | Gabriel et al. |
| 5,861,893 A | 1/1999 | Sturgess | 6,005,583 A | 12/1999 | Morrison |
| 5,867,166 A | 2/1999 | Myhrvold et al. | 6,005,584 A | 12/1999 | Kitamura et al. |
| 5,870,097 A | 2/1999 | Snyder et al. | 6,007,428 A | 12/1999 | Nishiumi et al. |
| 5,870,098 A | 2/1999 | Gardiner | 6,008,820 A | 12/1999 | Chauvin et al. |
| 5,870,102 A | 2/1999 | Tarolli et al. | 6,011,562 A | 1/2000 | Gagne et al. |
| 5,870,109 A | 2/1999 | McCormack et al. | 6,011,565 A | 1/2000 | Kuo et al. |
| 5,870,587 A | 2/1999 | Danforth et al. | 6,014,144 A | 1/2000 | Nelson et al. |
| 5,872,902 A | 2/1999 | Kuchkuda et al. | 6,016,150 A | 1/2000 | Lengyel et al. |
| 5,877,741 A | 3/1999 | Chee et al. | 6,016,151 A | 1/2000 | Lin |
| 5,877,770 A | 3/1999 | Hanaoka | 6,018,350 A | 1/2000 | Lee et al. |
| 5,877,771 A | 3/1999 | Drebin et al. | 6,020,931 A | 2/2000 | Bilbrey et al. |
| 5,880,736 A | 3/1999 | Peercy et al. | 6,021,417 A | 2/2000 | Massarksy |
| 5,880,737 A | 3/1999 | Griffin et al. | 6,022,274 A | 2/2000 | Takeda et al. |
| 5,883,638 A | 3/1999 | Rouet et al. | 6,023,261 A | 2/2000 | Ugajin |
| 5,886,701 A | 3/1999 | Chauvin et al. | 6,026,182 A | 2/2000 | Lee et al. |
| 5,886,705 A | 3/1999 | Lentz | 6,028,608 A | 2/2000 | Jenkins |
| 5,887,155 A | 3/1999 | Laidig | 6,031,542 A | 2/2000 | Wittig |
| 5,890,190 A | 3/1999 | Rutman | 6,035,360 A | 3/2000 | Doidge et al. |
| 5,892,517 A | 4/1999 | Rich | 6,037,948 A | 3/2000 | Liepa |
| 5,892,974 A | 4/1999 | Koizumi et al. | 6,038,031 A | 3/2000 | Murphy |
| 5,894,300 A | 4/1999 | Takizawa | 6,038,348 A | 3/2000 | Carley |
| 5,900,881 A | 5/1999 | Ikedo | 6,040,843 A | 3/2000 | Monroe et al. |
| 5,903,283 A | 5/1999 | Selwan et al. | 6,040,844 A | 3/2000 | Yamaguchi et al. |
| 5,909,218 A | 6/1999 | Naka et al. | 6,041,010 A | 3/2000 | Puar et al. |
| 5,909,225 A | 6/1999 | Schinnerer et al. | 6,043,804 A | 3/2000 | Greene |
| 5,912,675 A | 6/1999 | Laperriere | 6,043,821 A | 3/2000 | Sprague et al. |
| 5,912,676 A | 6/1999 | Malladi et al. | 6,046,746 A | 4/2000 | Deering |
| 5,914,721 A | 6/1999 | Lim | 6,046,747 A | 4/2000 | Saunders et al. |
| 5,914,725 A | 6/1999 | MacInnis et al. | 6,046,752 A | 4/2000 | Kirkland et al. |
| 5,914,729 A | 6/1999 | Lippincott | 6,049,337 A | 4/2000 | Van Overveld |
| 5,920,876 A | 7/1999 | Ungar et al. | 6,049,338 A | 4/2000 | Anderson et al. |
| 5,923,332 A | 7/1999 | Izawa | 6,052,125 A | 4/2000 | Gardiner et al. |
| 5,923,334 A | 7/1999 | Luken | 6,052,126 A | 4/2000 | Sakuraba et al. |
| 5,926,182 A | 7/1999 | Menon et al. | 6,052,127 A | 4/2000 | Vaswani et al. |
| 5,926,647 A | 7/1999 | Adams et al. | 6,052,129 A | 4/2000 | Fowler et al. |
| 5,933,150 A | 8/1999 | Ngo et al. | 6,052,133 A | 4/2000 | Kang |
| 5,933,154 A | 8/1999 | Howard et al. | 6,054,993 A | 4/2000 | Devic et al. |
| 5,933,155 A | 8/1999 | Akeley | 6,054,999 A | 4/2000 | Strandberg |
| 5,933,529 A | 8/1999 | Kim | 6,057,847 A | 5/2000 | Jenkins |
| 5,936,641 A | 8/1999 | Jain et al. | 6,057,849 A | 5/2000 | Haubner et al. |
| 5,936,683 A | 8/1999 | Lin | 6,057,851 A | 5/2000 | Luken et al. |
| 5,940,089 A | 8/1999 | Dilliplane | 6,057,859 A | 5/2000 | Handelman et al. |
| 5,940,538 A | 8/1999 | Spiegel et al. | 6,057,861 A | 5/2000 | Lee et al. |
| 5,943,058 A | 8/1999 | Nagy | 6,057,862 A | 5/2000 | Margulis |
| 5,943,060 A | 8/1999 | Cosman et al. | 6,057,863 A | 5/2000 | Olarig |
| 5,945,997 A | 8/1999 | Zhao et al. | 6,061,462 A | 5/2000 | Tostevin et al. |
| 5,949,421 A | 9/1999 | Ogletree et al. | 6,064,392 A | 5/2000 | Rohner |
| 5,949,423 A | 9/1999 | Olsen | 6,067,098 A | 5/2000 | Dye |
| 5,949,428 A | 9/1999 | Toelle et al. | 6,070,204 A | 5/2000 | Poisner |
| 5,956,042 A | 9/1999 | Tucker et al. | 6,072,496 A | 6/2000 | Guenter et al. |
| 5,956,043 A | 9/1999 | Jensen | 6,075,543 A | 6/2000 | Akeley |
| 5,958,020 A | 9/1999 | Evoy et al. | 6,075,546 A | 6/2000 | Hussain et al. |
| 5,959,640 A | 9/1999 | Rudin et al. | 6,078,311 A | 6/2000 | Pelkey |

| | | |
|---|---|---|
| 6,078,333 A | 6/2000 | Wittig et al. |
| 6,078,334 A | 6/2000 | Hanaoka et al. |
| 6,078,338 A | 6/2000 | Horan et al. |
| 6,081,274 A | 6/2000 | Shiraishi |
| 6,088,035 A | 7/2000 | Sudarsky et al. |
| 6,088,042 A | 7/2000 | Handelman et al. |
| 6,088,487 A | 7/2000 | Kurashige |
| 6,088,701 A | 7/2000 | Whaley et al. |
| 6,091,431 A | 7/2000 | Saxena et al. |
| 6,092,158 A | 7/2000 | Harriman et al. |
| 6,094,200 A | 7/2000 | Olsen et al. |
| 6,097,435 A | 8/2000 | Stanger et al. |
| 6,097,437 A | 8/2000 | Hwang |
| 6,104,415 A | 8/2000 | Gossett |
| 6,104,417 A | 8/2000 | Nielsen et al. |
| 6,105,094 A | 8/2000 | Lindeman |
| 6,108,743 A | 8/2000 | Debs et al. |
| 6,111,582 A | 8/2000 | Jenkins |
| 6,111,584 A | 8/2000 | Murphy |
| 6,115,047 A | 9/2000 | Deering |
| 6,115,049 A | 9/2000 | Winner et al. |
| 6,118,462 A | 9/2000 | Margulis |
| 6,128,026 A | 10/2000 | Brothers, III |
| 6,144,365 A | 11/2000 | Young et al. |
| 6,144,387 A | 11/2000 | Liu et al. |
| 6,151,602 A | 11/2000 | Hejlsberg et al. |
| 6,155,926 A | 12/2000 | Miyamoto et al. |
| 6,157,387 A | 12/2000 | Kotani |
| 6,166,748 A | 12/2000 | Van Hook et al. |
| 6,172,678 B1 | 1/2001 | Shiraishi |
| 6,177,944 B1 | 1/2001 | Fowler et al. |
| 6,191,794 B1 | 2/2001 | Priem et al. |
| 6,200,253 B1 | 3/2001 | Nishiumi et al. |
| 6,204,851 B1 | 3/2001 | Netschke et al. |
| 6,215,496 B1 | 4/2001 | Szeliski et al. |
| 6,215,497 B1 | 4/2001 | Leung |
| 6,226,713 B1 | 5/2001 | Mehrotra |
| 6,229,553 B1 | 5/2001 | Duluk, Jr. et al. |
| 6,232,981 B1 | 5/2001 | Gossett |
| 6,236,413 B1 | 5/2001 | Gossett et al. |
| 6,239,810 B1 | 5/2001 | Van Hook et al. |
| 6,252,608 B1 | 6/2001 | Snyder et al. |
| 6,252,610 B1 | 6/2001 | Hussain |
| 6,264,558 B1 | 7/2001 | Nishiumi et al. |
| 6,268,861 B1 | 7/2001 | Sanz-Pastor et al. |
| 6,268,875 B1 | 7/2001 | Duluk, Jr. et al. |
| 6,275,235 B1 | 8/2001 | Morgan, III |
| 6,285,378 B1 | 9/2001 | Duluk, Jr. |
| 6,285,779 B1 | 9/2001 | Lapidous et al. |
| 6,288,730 B1 | 9/2001 | Duluk, Jr. et al. |
| 6,292,194 B1 | 9/2001 | Powell, III |
| 6,329,997 B1 | 12/2001 | We et al. |
| 6,331,856 B1 | 12/2001 | Van Hook et al. |
| 6,333,744 B1 | 12/2001 | Kirk et al. |
| 6,339,428 B1 | 1/2002 | Fowler et al. |
| 6,342,892 B1 | 1/2002 | Van Hook et al. |
| 6,353,438 B1 | 3/2002 | Van Hook |
| 6,356,497 B1 | 3/2002 | Puar et al. |
| 6,408,362 B1 | 6/2002 | Arimilli et al. |
| 6,417,858 B1 | 7/2002 | Bosch et al. |
| 6,426,747 B1 | 7/2002 | Hoppe et al. |
| 6,437,781 B1 | 8/2002 | Tucker et al. |
| 6,459,429 B1 | 10/2002 | Deering |
| 6,466,223 B1 | 10/2002 | Dorbie et al. |
| 6,469,707 B1 | 10/2002 | Voorhies |
| 6,476,808 B1 | 11/2002 | Kuo et al. |
| 6,476,822 B1 | 11/2002 | Burbank |
| 6,496,187 B1 | 12/2002 | Deering et al. |
| 6,532,013 B1 | 3/2003 | Papakipos et al. |
| 6,597,363 B1 * | 7/2003 | Duluk, Jr. et al. .......... 345/506 |

FOREIGN PATENT DOCUMENTS

| | | |
|---|---|---|
| JP | 9-330230 | 12/1997 |
| WO | WO/93/04429 | 3/1993 |
| WO | WO 93/23816 | 11/1993 |
| WO | WO 97/05575 | 2/1997 |
| WO | WO 97/05576 | 2/1997 |
| WO | WO 00/10372 | 3/2000 |
| WO | WO 00/11562 | 3/2000 |
| WO | WO 00/11602 | 3/2000 |
| WO | WO 00/11603 | 3/2000 |
| WO | WO 00/11604 | 3/2000 |
| WO | WO 00/11605 | 3/2000 |
| WO | WO 00/11607 | 3/2000 |
| WO | WO 00/11613 | 3/2000 |
| WO | WO 00/11614 | 3/2000 |
| WO | WO00/19377 | 4/2000 |

OTHER PUBLICATIONS

"RenderMan Artist Tools, PhotoRealistic RenderMan 3.8 User's Manual," Pixar (Aug. 1998).

"RenderMan Interface Version 3.2" (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCTS3 Texture Blending" (Dec. 16, 1999).

Peter J. Kovach, *Inside Direct 3D*, "Alpha Testing," pp. 289-291 (1999).

Neider, et al., Open GL Programming Guide, The Official Guide to Learning OpenGL, Release 1, pp. 301-302 (1993).

Web site information, CartoonReyes, REM Infografica, http://www.digimotion.co.uk/cartoonreyes.htm.

Raskar, Ramesh et al., "Image Precision Silhouette Edges," *Symposium on Interactive 3D Graphics* 1999, Atlanta, 7 pages (Apr. 26-29, 1999).

Schlechtweg, Stefan et al., Rendering Line-Drawings with Limited Resources, *Proceedings of GRAPHICON '96, 6th International Conference and Exhibition on Computer Graphics and Visualization in Russia*, (St. Petersburg, Jul. 1-5, 1996) vol. 2, pp. 131-137.

Haeberli, Paul et al., "Texture Mapping as a Fundamental Drawing Primitive," *Proceedings of the Fourth Eurographics Workshop on Rendering*, 11pages, Paris, France (Jun. 1993).

Schlechtweg, Stefan et al., "Emphasising in Line-drawings," *Norsk samarbeid innen grafisk databehandling: NORSIGD Info, medlemsblad for NORSIGD*, Nr 1/95, pp. 9-10.

Markosian, Lee et al., "Real-Time Nonphotorealistic Rendering," Brown University site of the NSF Science and Technology Center for Computer Graphics and Scientific Visualization, Providence, RI, 5 pages (undated).

Feth, Bill, "Non-Photorealistic Rendering," wif3@cornell.edu, CS490—Bruce Land, 5 pages (Spring 1998).

Elber, Gershon, "Line Art Illustrations of Parametric and Implicit Forms," *IEEE Transactions on Visualization and Computer Graphics*, vol. 4, No. 1, Jan.-Mar. 1998.

Zeleznik, Robert et al. SKETCH: An Interface for Sketching 3D Scenes, *Computer Graphics Proceedings, Annual Conference Series* 1996, pp. 163-170.

*Computer Graphics World*, Dec. 1997.

Reynolds, Craig, "Stylized Depiction in Computer Graphics, Non-Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Decaudin, Philippe, "Cartoon-Looking Rendering of 3D Scenes," Syntim Project Inria, 6 pages, http://www-syntim.inria.fr/syntim/recherche/decaudin/cartoon-eng.html.

Hachigian, Jennifer, "Super Cel Shader 1.00Tips and Tricks," 2 pages, wysiwyg://the Page.13/http://members.xoom/_XMCM.javia/3D/celshade.html.

Digimation Inc., "The Incredible Comicshop," info sheet, 2 pages http://www.digimation.com/asp/product/asp?product_id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.com-ani.co.uk/casweb/products/software/SceneIII.htm.

Mulligan, Vikram, "Toon," info sheet, 2 pages, http://digitalcarversguild.com/products/toon/toon.thml.

Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad.

web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

Render Man Artist Tools, Using Arbitrary Output Variables in Photoreasistic Renderman (With Applications) PhotoRealistic Renderman Application Note #24 (Jun. 1998).

Dacaudin, Philippe, "Cartoon-Looking Rendering of 3D Scenes," Inria Syntim Project (Dec. 6, 1998).

Gooch et al., "A non-Photorealistic Lighting Model for Automatic Technical Illustration," presented at "SIGGRAPH 98," Orange County Convention Center, Orlando, FL (Jul. 19-24, 1998).

GDC 2000: Advanced OpenGL Game Development, "A Practical and Robust Bump-mapping Techinique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addressing," Sim Dietrich, Jan. 6, 2000, www.nvidia.com.

White paper, Huddy, Richard, "The Efficient Use of Vertex Buffers," (Nov. 1, 2000).

White paper, Spitzer, John, et al., "Using GL_NV_array_range and GL_NV_Fence on GEForce Products and Beyond" Aug. 1, 2000.

White paper, Rogers, Douglas H., "Optimizing Direct3D for the GeForce 256" (Jan. 3, 2000).

Hook, Brian, "An Incomplete Guide to Programming DirectDraw and Direct3D Immediate Mode (Release 0.46)," printed from web site: www.wksoftware.com, 42 pages.

Thompson, Tom, "Must-See 3-D Engines," BYTE Magazine, printed from web site ww.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 97).

"HOWTO: Animate Textures in Direct3D Immediate Mode," printed from web site support.microsoft.com, 3 pages (last reviewed Dec. 15, 2000).

INFO: Rendering a Triangle Using an Execute Buffer, printed from web site support.microsoft.com, 6 pages (last reviewed Oct. 20, 2000).

U.S. Appl. No. 09/337,293 filed Jun. 21, 1999, Multi-Format Vertex Data Processing Apparatus and Method [issued as U.S. Patent No. 6,501,479 B1 on Dec. 31, 2002.]

Datasheet, SGS-Thomson Microelectronics, nVIDIA™, RIVA 128™ 128-Bit 3D Multimedia Accelerator (Oct. 1997).

Product Presentation, "RIVA128™ Leadership 3D Acceleration," 2 pages.

ZDNet Reviews, from PC Magazine, "Other Enhancements," Jan. 15, 1999, wysiwyg://16/http://www4.zdnet.com...ies/reviews/0,4161,2188286,00.html.

ZDNet Reviews, from PC Magazine, "Screen Shot of Alpha-channel Transparency," Jan. 15, 1999, wysiwyg://16/http://www4.zdnet.com...ies/reviews/0,4161,2188286,00.html.

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDT/d...penGL/advanced98/notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A-buffer Algorithm," Computer Graphics Proceedings, Annual Conference Series, 1997, pp. 307-316.

Debevec, Paul, et al., "Efficient View-Dependent Image-Based Rendering with Projective Texture-Mapping," University of California at Berkeley.

Gibson, Simon, et al., "Interactive Rendering with Real-World Illumination," Rendering Techniques 2000; 11th Eurographics Workshop on Rendering, pp. 365-376 (Jun. 2000).

Segal, Mark, et al., "Fast Shadows and Lighting Effects Using Texture Mapping," Computer Graphics, 26, 2, pp. 249-252 (Jul. 1992).

White paper, Kilgard, Mark J., "Improving Shadows and Reflections via the Stencil Buffer" (Nov. 3, 1999).

"OpenGL Projected Textures," from web site:HTTP://reality.sgi.com, 5 pages.

"5.13.1 How to Project a Texture," from web site: www.sgi.com, 2 pages.

Arkin, Alan, email, subject: "Texture distortion problem,"from web site: HTTP://reality.sgi.com (Jul. 1997).

Moller, Tomas et al., "Real-Time Rendering," pp. 179-183 (AK Peters Ltd., 1999).

Williams, Lance, "Casting Curved Shadows on Curved Surfaces," Computer Graphics (SIGGRAPH '78 Proceedings), vol. 12, No. 3, pp. 270-274 (Aug. 1978).

Woo et al., "A Survey of Shadow Algorithms," IEEE Computer Graphics and Applications, vol. 10, No. 6, pp. 13-32 (Nov. 1990).

Heidrich et al., "Applications of Pixel Textures in Visualization and Realistic Image Synthesis," Proceedings 1999 Symposium On Interactive 3D Graphics, pp. 127-134 (Apr. 1999).

Hourcade et al, "Algorithms for Antialiased Cast Shadows", Computers and Graphics, vol. 9 No. 3, pp. 260- 265 (1985).

Michael McCool, "Shadow Volume Reconstruction from Depth Maps", ACM Transactions on Graphics, vol. 19, No. 1, Jan. 2000, pp. 1-26.

The RenderMan Interface Version 3.1, (Sep. 1989).

"Renderman Artist Tools, PhotoRealistic RenderMan Tutorial," Pixar (Jan. 1996).

Web site materials, "Renderman Artist Tools, PhotoRealistic RenderMan 3.8 User's Manual," Pixar.

NVIDIA.com, technical presentation, "AGDC Per-Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

Slide Presentation, Sébastien Dominé, "nVIDIA Mesh Skinning, OpenGl".

Singh, Karan et al., "Skinning Characters using Surface-Oriented Free-Form Deformations," Toronto Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Release, "ATI's RADEON family of products delivers the most comprehensive support for the advance graphics features of DirectX 8.0," Canada, from ATI.com web site, 2 pages (Nov. 9, 2000).

"ATI Radeon Skinning and Tweening," from ATI.com web site, 1 page (2000).

Hart, Evan et al., "Vertex Shading with Direct3D and OpenGL," Game Developers Conference 2001, from ATI. com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, Issue 9A Sep. 1, 1993, pp. 307-312.

Shade, Jonathan et al., "Layered Depth Images," Computer Graphics Proceedings, Annual Conference Series, pp. 231-242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings of SIGGRAPH, pp. 269-276 (Aug. 8-13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109-116.

Lance Williams, "Pyramidal Parametrics"; Jul. 1983; Computer Graphics, vol. 17, No. 3; Computer Graphics Laboratory, New York Institute of Technology, Old Westbury, NY; pp. 1-11.

James F. Blinn et al., "Texture and Reflection in Computer Generated Images"; Oct. 1976; Graphics and Image Processing; Association for Computing Machinery, Inc. pp. 542-547.

Ned Greene, New York Institute of Technology; "Environment Mapping and Other Applications of World Projections"; Nov. 1986; The Institute of Electrical and Electronics Engineers Inc. Computer Society; pp. 21-29.

* cited by examiner

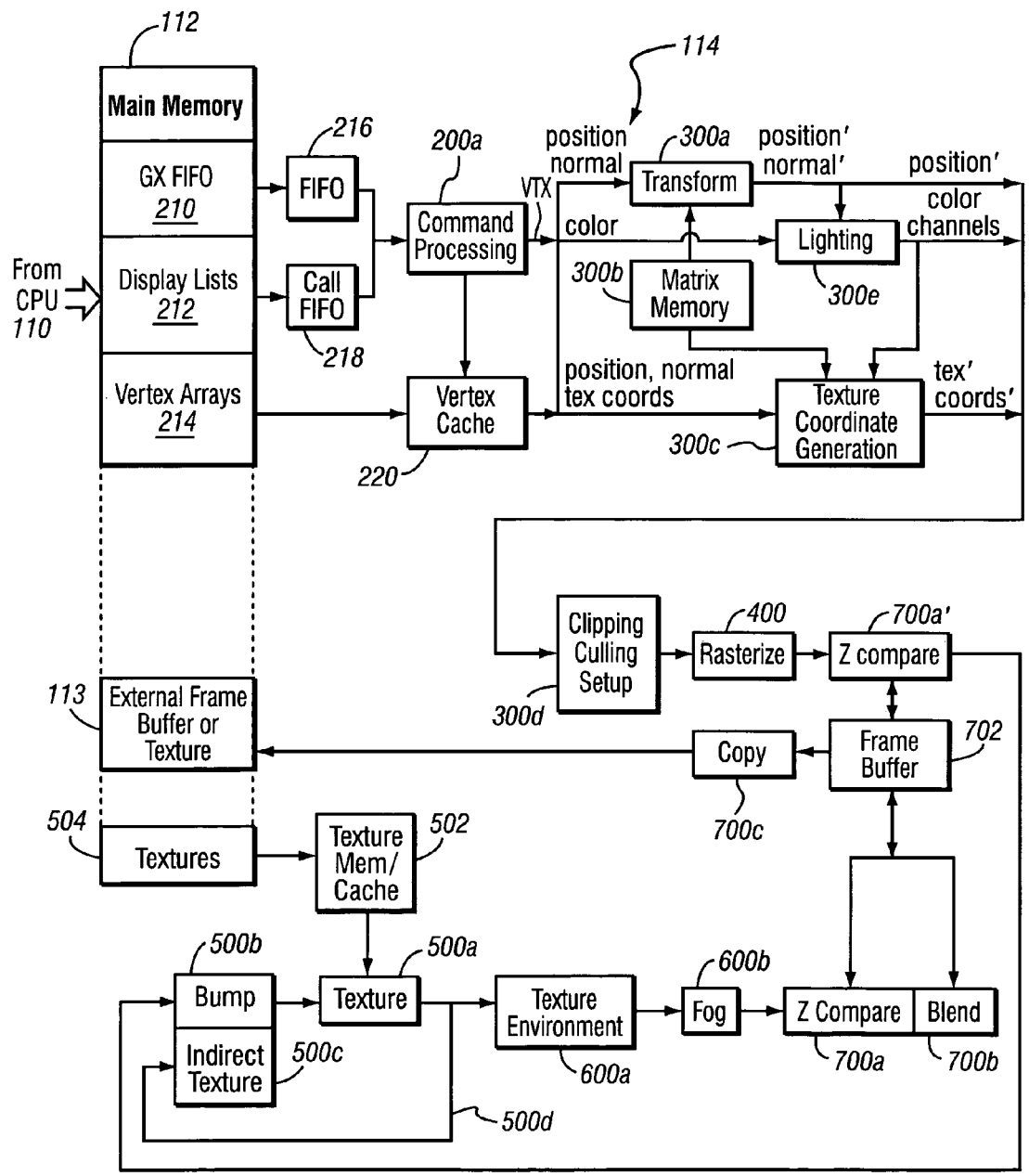
Fig. 5 EXAMPLE GRAPHICS PROCESSOR FLOW

Example Shader Pipeline tc = texture color/nop, cc = computed color, rc = rasterized color Example Reusable Sub-Blend Stage

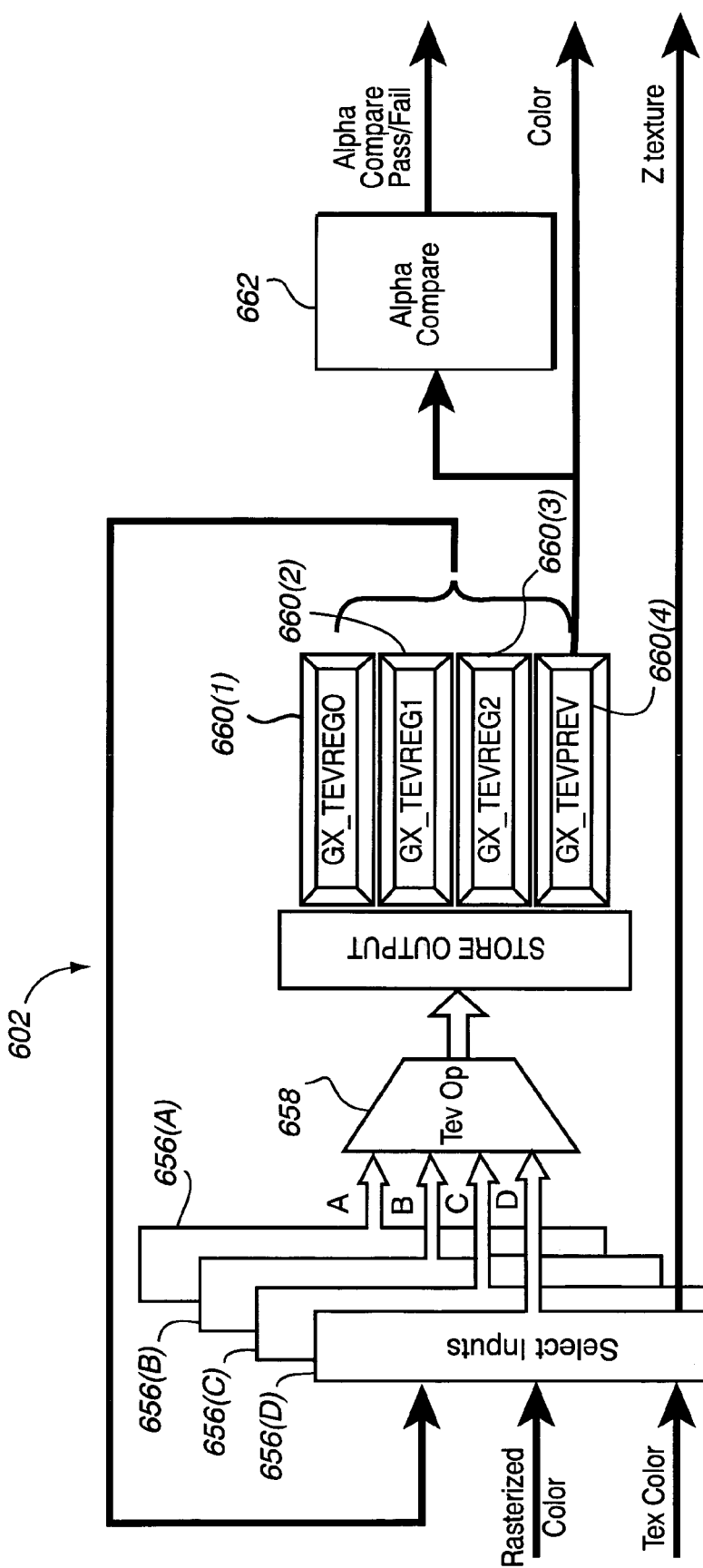
Fig. 8 Example Recirculating Shader

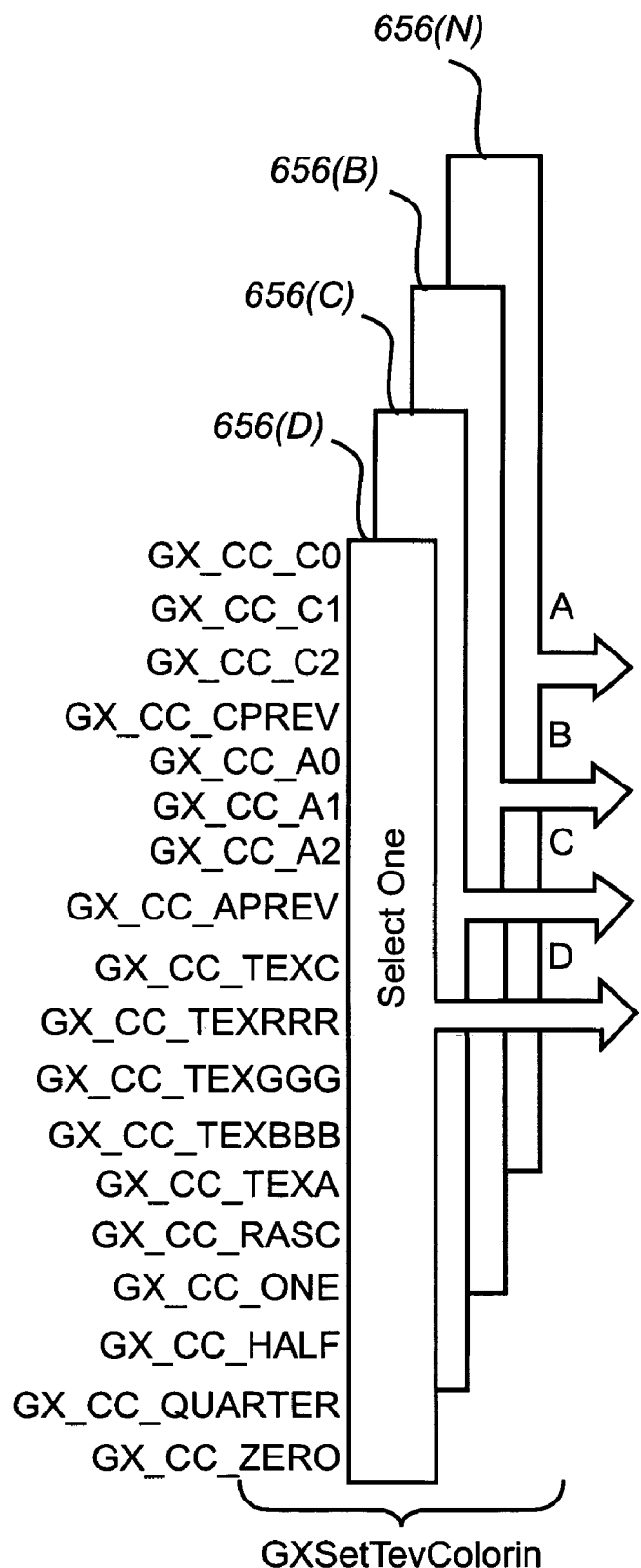
Fig. 9 Example Recirculating Shader Input Multiplexer

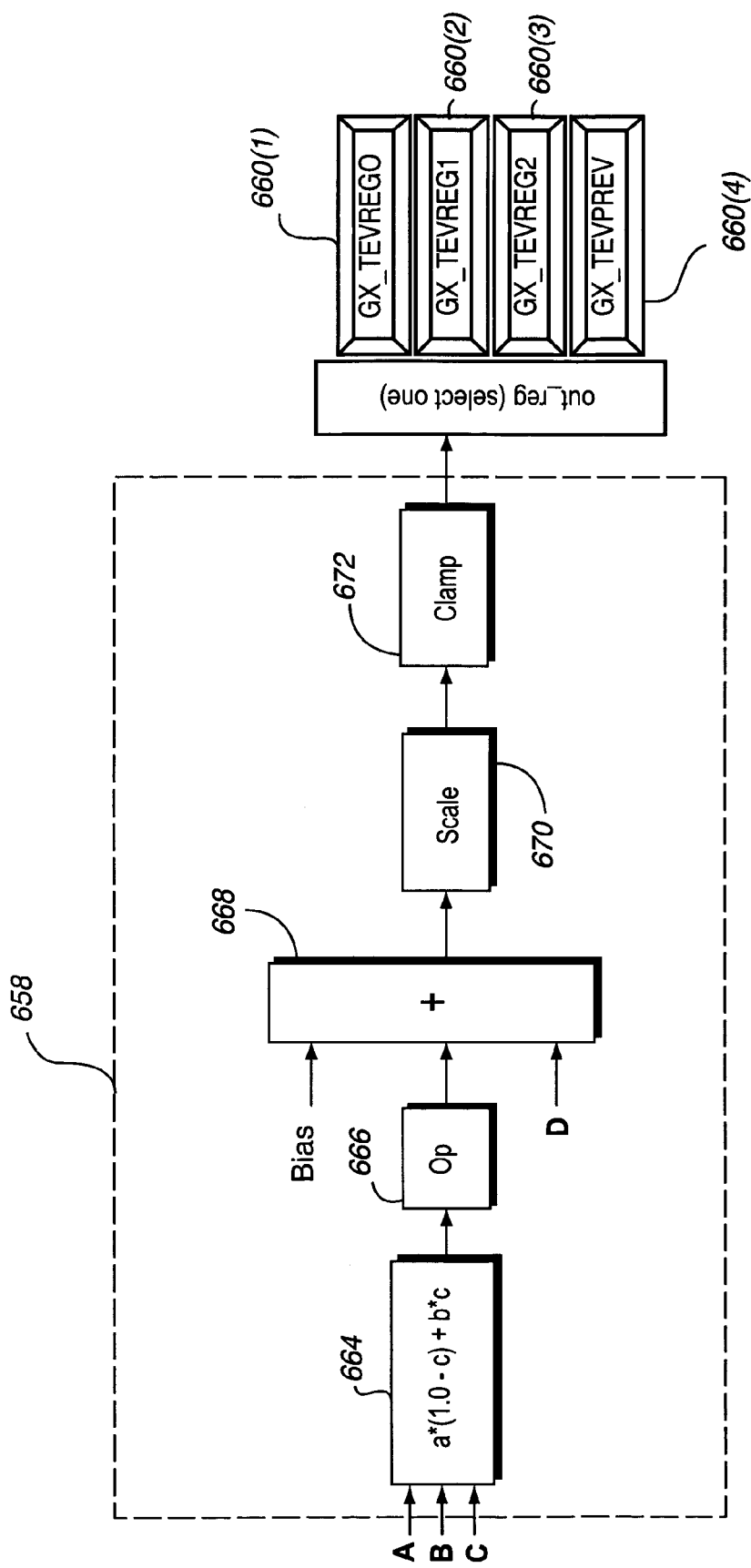
Fig. 10 Example Recirculating Shader Operation Block Diagram

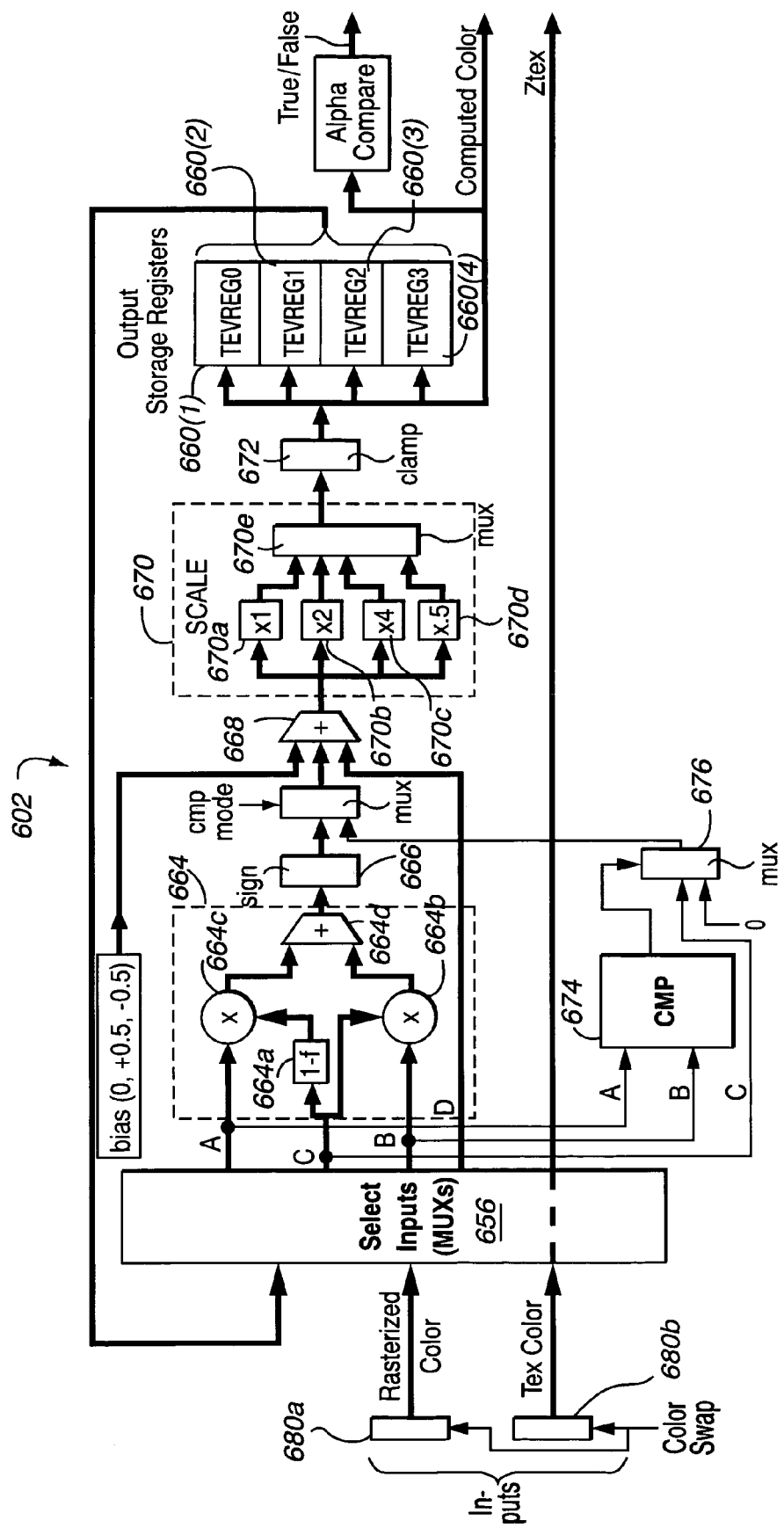
Fig. 11 Example Recirculating Shader Implementation

Fig. 12a  Example Color Swap Feature
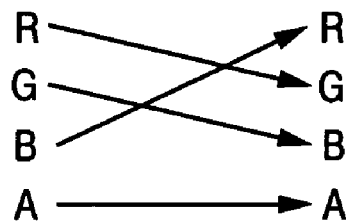
Programmable Color Swap
Fig. 12b  Example Color Swap Feature
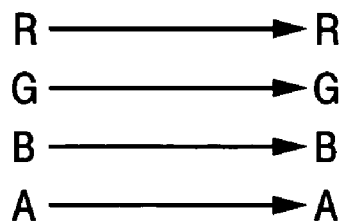
Default

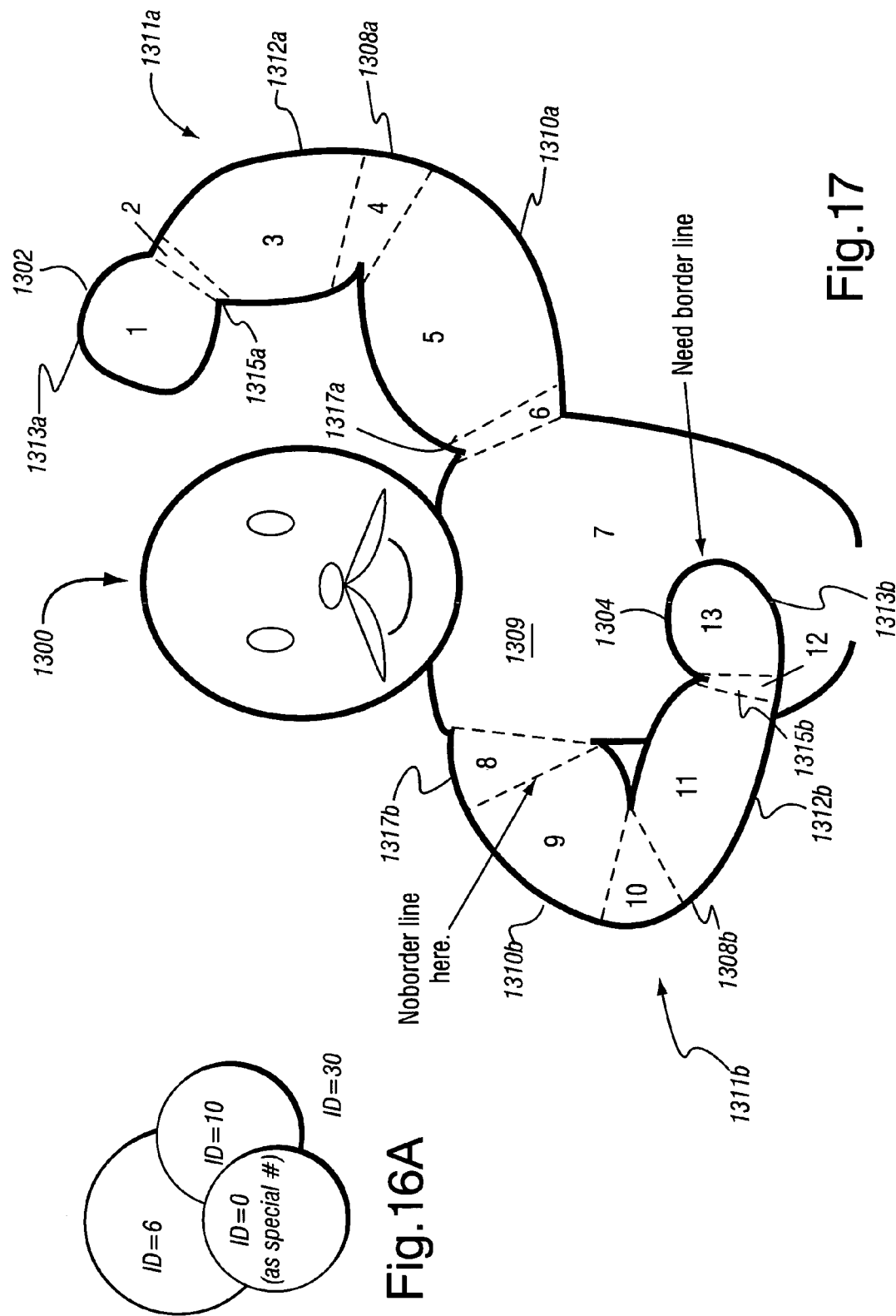

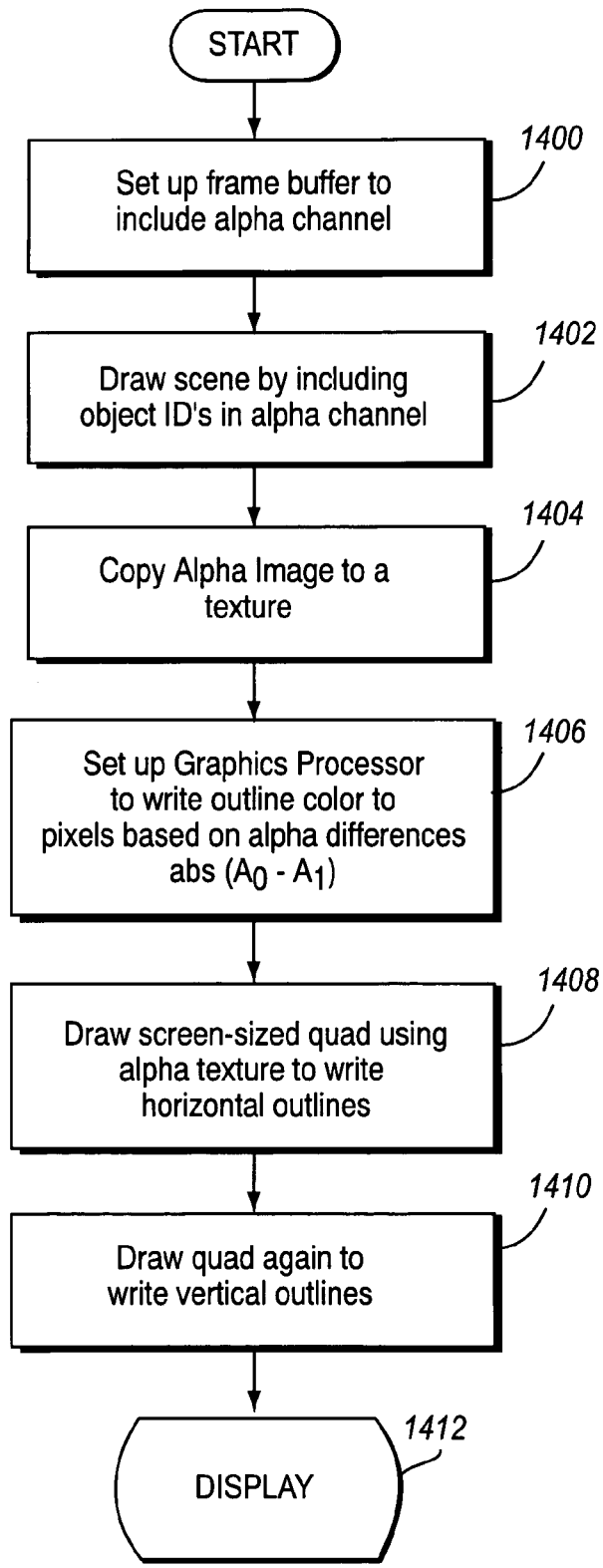
Fig. 19 EXAMPLE CARTOON OUTLINING PROCESS

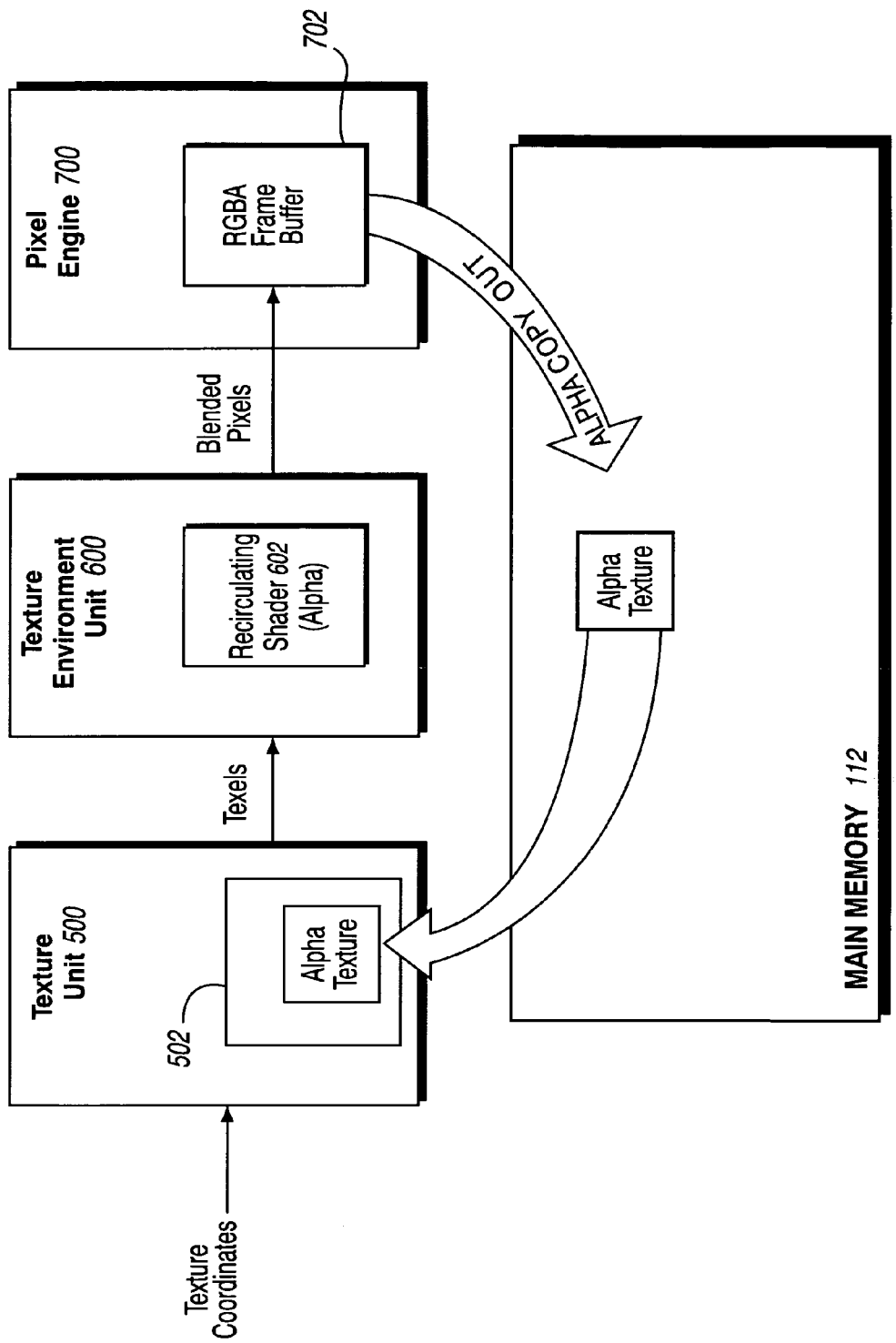
Fig. 20 EXAMPLE CARTOON OUTLINING PIPELINE

METHOD AND APPARATUS FOR PROVIDING LOGICAL COMBINATION OF N ALPHA OPERATIONS WITHIN A GRAPHICS SYSTEM

CROSS-REFERENCE TO RELATED APPLICATIONS

This application claims the benefit of U.S. Provisional Application Nos. 60/226,915 and 60/226,888 filed Aug. 23, 2000, the entire contents of which are hereby incorporated by reference. This application is related to concurrently-filed application Ser. No. 09/722,367 of Drebin et al entitled "Recirculating Shade Tree Blender For a Graphics System".

FIELD OF THE INVENTION

The present invention relates to computer graphics, and more particularly to interactive graphics systems such as home video game platforms. Still more particularly, this invention relates to the use of logical combination of N alpha channel operations to generate interesting visual graphics effects including but not limited to non-photorealistic images such as cartoon outlining.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

Most computer graphics research has tended to focus on producing realistic images. This research has been very successful. Computers can now generate images that are so realistic that you can't tell them apart from photographs. For example, many of us have seen very convincing dinosaurs, aliens and other photorealistic computer-generated special effects in movie and television. New pilots train on computer-based flight simulators so realistic that they nearly duplicate actual flying. Low-cost home video game systems can now provide a remarkable degree of realism, giving the game player an illusion of driving a real race car along a track, skiing down a snow and ice covered ski slope, walking through a medieval castle, or the like. For most games, this illusion of realism significantly enhances the game play experience.

One way to enhance realism is to model the opacity (transparency) of surfaces using a technique called "alpha blending." Using this conventional technique, each image element is assigned an "alpha value" representing its degree of opacity. The colors of the image element are blended based on the alpha value— allowing one object to appear to be visible through another object. A further conventional technique called "alpha function" or "alpha test" can be used to discard an object fragment based on comparing the fragment's alpha value with a reference function or value. Alpha test may decide to not blend (i.e., to throw away) a potential part of an image because it is transparent and will therefore be invisible.

Alpha blending and alpha test are especially useful for modeling transparent objects such as water and glass. This same functionality can also be used with texture mapping to achieve a variety of effects. For example, the alpha test is frequently used to draw complicated geometry using texture maps on polygons—with the alpha component acting as a matte. By way of illustration, a tree can be drawn as a picture (texture) of a tree on a polygon. The tree parts of the texture image can have an alpha value of 1 (opaque), and the non-tree parts can have an alpha value of 0 (transparent). In this way, the "non-tree" parts of the polygons are mapped to invisible (transparent) portions of the texture map, while the "tree" portions of the polygon are mapped to visible (opaque) portions of the texture map.

The alpha component of a texture can be used in other ways—for example, to cut holes or trim surfaces. As one example, an image of a cutout or a trim region can be stored in a texture map. When mapping the texture to the polygon surface, alpha testing or blending can be used to cut the cutout or trimmed region out of the polygon's surface. Additionally, the alpha channel of a computer graphics system can be also be used to provide non-photorealistic image effects such as cartoon outlining. An arrangement described in U.S. patent application Ser. No. 09/468,109 filed Dec. 21, 1999 uses the alpha channel of a real time rendering system to encode identifications corresponding to different objects or portions of objects. The system renders the objects into a color frame buffer, and writes corresponding object Ids into an alpha frame buffer. An alpha test operation is performed on the alpha frame buffer, and the alpha compare results (i.e., the absolute value of the difference between two alpha values) are used to selectively blend outline coloration around silhouette and other edges defined between image areas encoded with different alpha/Ids.

Typical generally available 3D graphics application programmer interfaces such as DirectX and OpenGL support alpha compares for transparency or other purposes, e.g., to compare an iterated or texture alpha to a constant and "kill" the pixel in the compare fails. As one example, Direct3D provides a command "D3DRENDERSTATE_ALPHATEST-ENABLE that can be used to enable alpha testing. The command D3DCOMFUNC enumerated type allows the programmer to specify the possible tests used in the alpha compare operation (e.g., never, always, <, >, less than or equal to, greater than or equal to, not equal to, etc.) For example, if the alpha comparison function is set to "greater than or equal to", then if the pixel being rasterized is less opaque than the color already at the pixel, Direct3D will skip it completely— saving the time that would have been required to blend the two colors together and preventing the color and z buffers from being updated. It is also possible to compare the incoming alpha with a programmer-specified reference alpha value (e.g., "if (alpha<128/255) then kill the pixel) by using the D3DRENDERSTATE_ALPHAREF command. See, e.g., Kovach, *Inside Direct3D* (Microsoft 2000) at 289–291. Similar alpha testing/comparison capabilities are provided in OpenGL by the GL_ALPHA_TEST, GL_ALPHA_TEST_FUNC and GL_ALPHA_TEST_REF commands. See, e.g., Neider et al, *OpenGL Programming Guide* (Addison-Wesley 1993) at 301–302.

An issue that arises when implementing various complex alpha comparisons including but not limited to the cartoon outlining algorithm mentioned above, is how to efficiently perform more complicated alpha comparisons in hardware using a single rendering pass. For example, while arbitrarily complex alpha tests can typically be straightforwardly be performed by a processor executing software, it may be desirable (e.g., for increased speed performance) to use a hardware-based alpha test. Such an arbitrarily complex alpha test capability has not generally been available in the past within the context of a low cost graphics system such as a home video game or a personal computer graphics card.

The present invention solves this problem by providing a hardware-based pixel shader capable of performing plural alpha comparisons that can be logically combined to achieve a wide range of alpha test functionality. In accordance with one aspect of the invention, the pixel shader can be used to provide a transparency tree analogous to a shade tree. In particular, alpha functionality can be used to provide N logical alpha operations on M alpha inputs, where N and M can be any integers.

One aspect of the invention provides a method of generating a graphics image comprising generating information representing a surface to be imaged, said information including alpha; performing, within the same rendering pass, plural alpha comparisons on said alpha information to provide corresponding plural alpha comparison results; logically combining said plural alpha comparison results; and rendering said graphics image based at least in part on said logical combination. The rendering step may include selecting whether or not to kill a pixel based on said logical combination. The performing step can be performed in hardware and/or using a recirculating shader.

In accordance with a further aspect provided by the invention, a graphics system comprises a texture unit including a texture coordinate matrix multiplier; a shader including an alpha channel; an embedded frame buffer that can store an alpha image; and a copy-out pipeline for copying an alpha image from said frame buffer for use as a texture by said texture unit, wherein said graphics system performs plural alpha comparisons in a single rendering pass.

The combination of alpha compares and alpha logical operations can be used for a wide range of additional alpha-based effects. For example, dual alpha comparisons can be used to provide non-photorealistic effects such as cartoon outlining (e.g., to efficiently determine whether to blend a cartoon outline color based on said logical combination by implementing an absolute value function).

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

FIG. 8 shows an example recirculating shader block diagram;

FIG. 9 shows an example recirculating shader input multiplexer;

FIG. 10 shows an example recirculating shader operation block diagram;

FIG. 11 shows an example recirculating shader implementation;

FIGS. 12A and 12B illustrate an example color swap feature;

FIGS. 13–18C show an example cartoon outlining technique using alpha information to encode object ID;

FIG. 19 shows an example cartoon outlining process performed by system 50;

FIG. 20 shows an example cartoon outlining pipeline implemented by system 50.

DETAILED DESCRIPTION OF EXAMPLE EMBODIMENTS OF THE INVENTION

Figure 1:
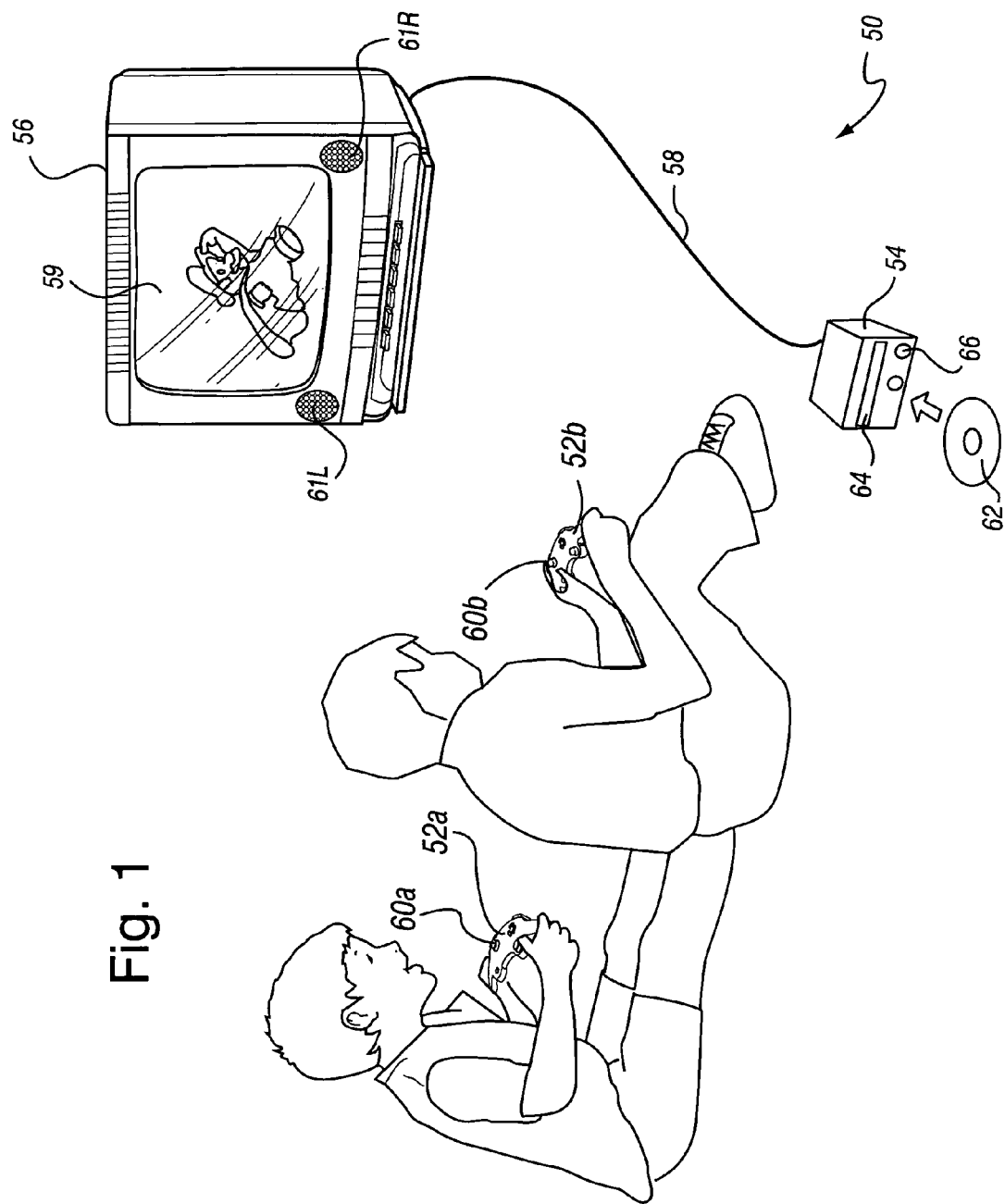
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
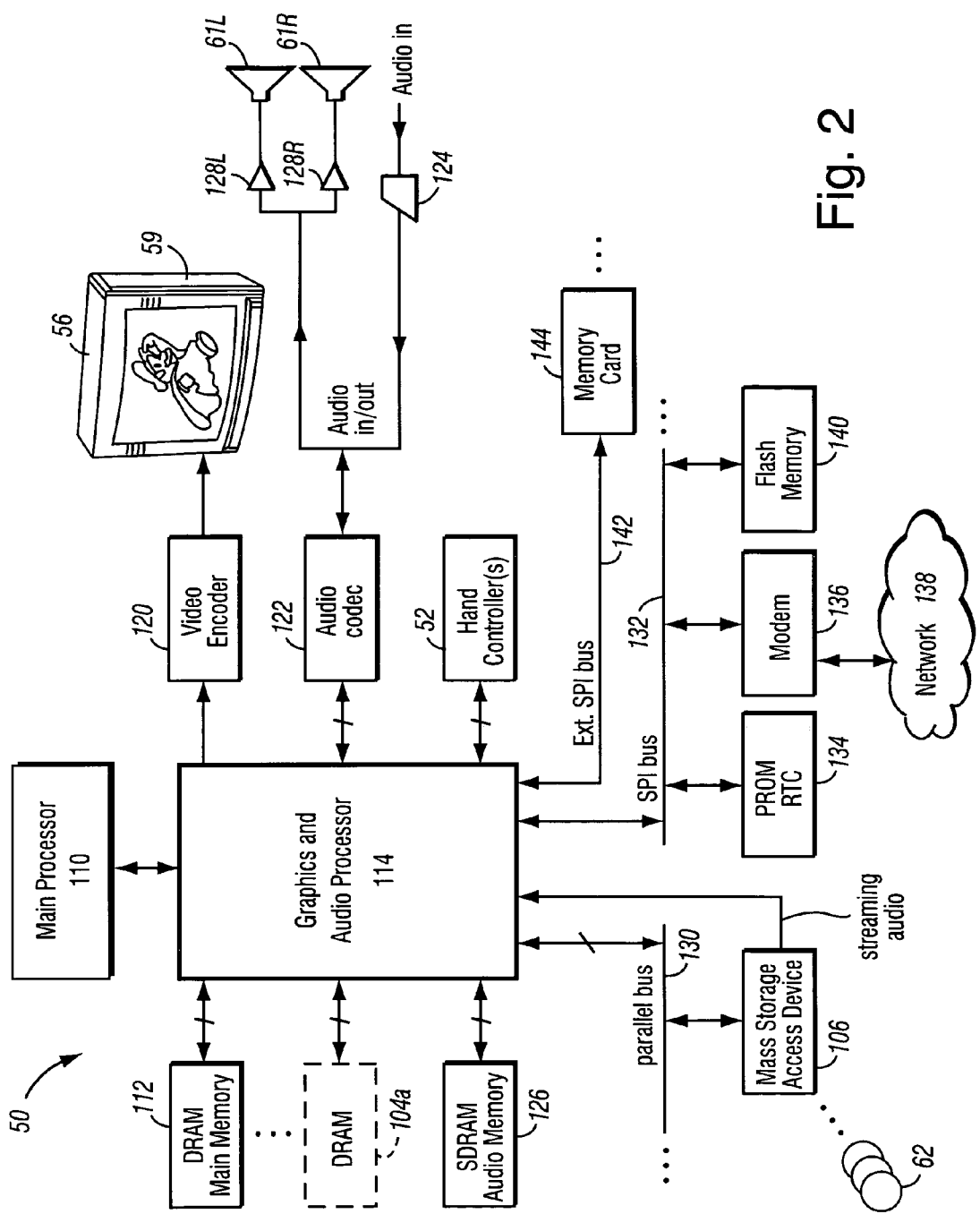
FIG. 2 is a block diagram of the FIG. 1 example computer graphics system.

FIG. 2 shows a block diagram of example components of system 50. The primary components include:
- a main processor (CPU) 110,
- a main memory 1112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
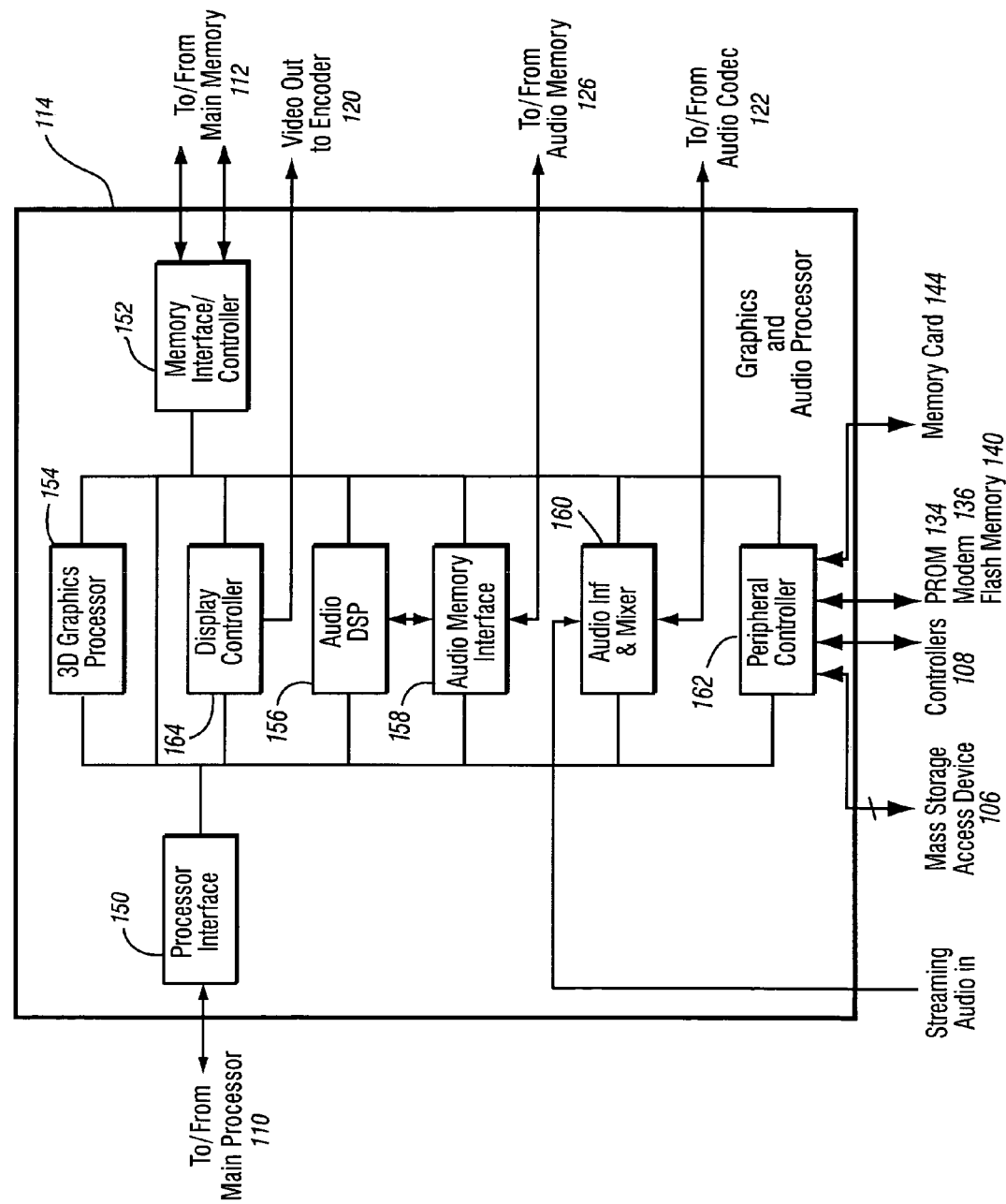
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
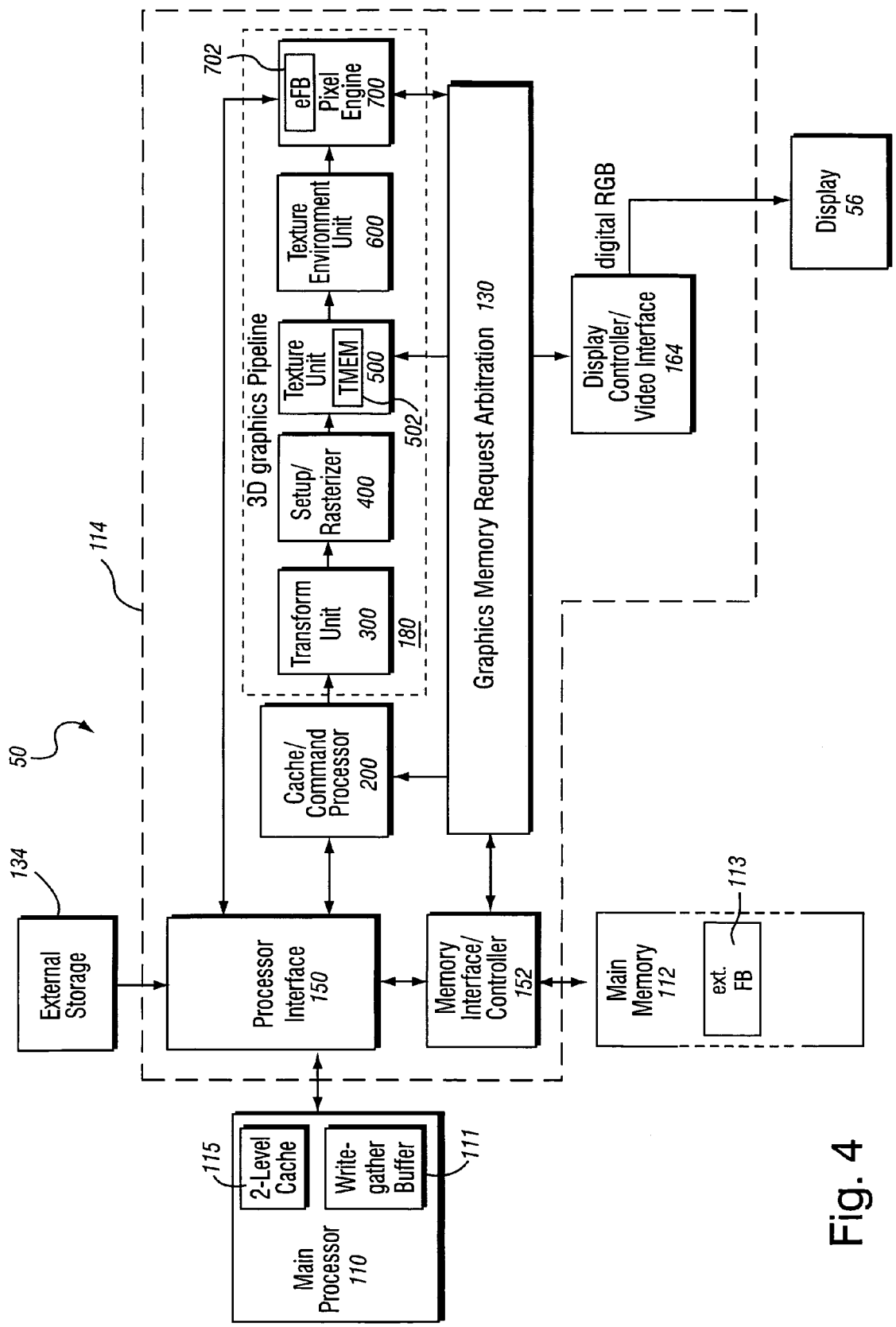
FIG. 4 is a block diagram of the example 3D graphics processor shown in FIG. 3.
Figure 7:
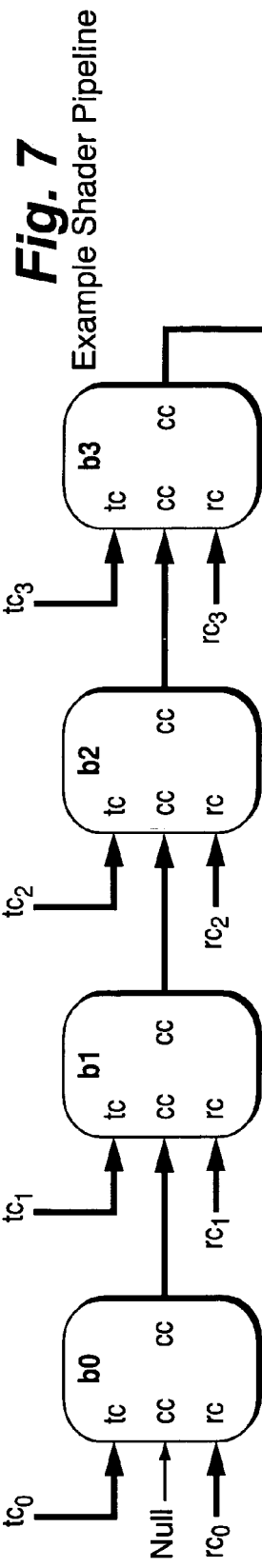
FIG. 7 shows an example shading pipeline implemented using the recirculating shader.
Figure 6:
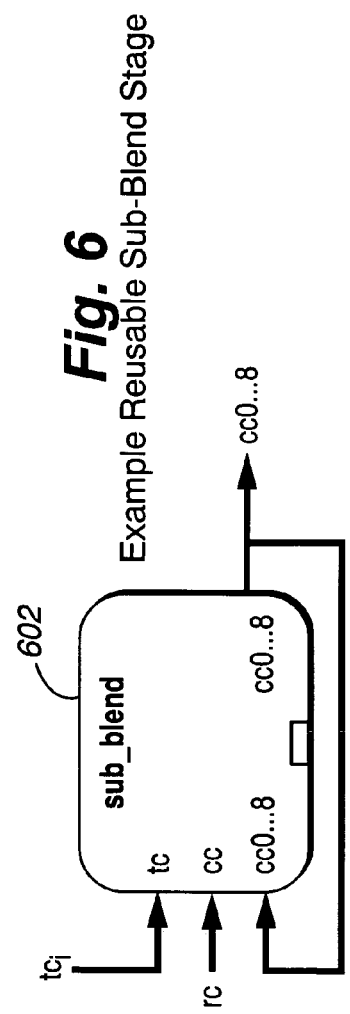
FIG. 6 shows an example reusable recirculating shader.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 1300, a setup/rasterizer 400, a texture unit 500, a texture environment unit 600, and a pixel engine 700.

Transform unit 1300 performs a variety of 2D and 3D transform and other operations 300*a* (see FIG. 5). Transform unit 1300 may include on or more matrix memories 300*b* for storing matrices used in transformation processing 300*a*. Transform unit 1300 transforms incoming geometry per vertex from object space to screen space; and transforms incoming texture coordinates and computes projective texture coordinates (300*c*). Transform unit 1300 may also perform polygon clipping/culling 300*d*. Lighting processing 300*e* also performed by transform unit 300*b* provides per vertex lighting computations for up to eight independent lights in one example embodiment. Transform unit 1300 can also perform texture coordinate generation (300*c*) for embossed type bump mapping effects, as well as polygon clipping/culling operations (300*d*).

Setup/rasterizer 400 includes a setup unit which receives vertex data from transform unit 1300 and sends triangle setup information to one or more rasterizer units (400*b*) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500*a*) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500*b*), and indirect texture processing (500*c*).

Texture unit 500 outputs filtered texture values to the texture environment unit 600 for texture environment processing (600*a*). Texture unit 500 is recirculating, and is able to perform both direct and indirect texturing and providing a sequence of texture mapping outputs to texture environment unit 600 for blending during a single rendering pass. See U.S. patent application Ser. No. 09/722,382 entitled "Method And Apparatus For Indirect Texture Referencing In A Graphics System", and its corresponding provisional application Ser. No. 60/226,891, filed Aug. 23, 2000, both of which are incorporated herein by this reference.

Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending. For example, the texture environment unit 600 of system 50 includes a recirculating shader providing a separately controllable alpha channel that processes alpha information independently of color information without slowing down the graphics pipeline. The recirculating shader design of texture environment unit 600 makes it possible to implement alpha transparency "shade trees" providing arbitrarily complex alpha blending and comparison functions. See commonly assigned U.S. patent application Ser. No. 09/722,367 entitled "Recirculating Shade Tree Blender For A Graphics System", and its corresponding provisional application, Ser. No. 60/226,888, filed Aug. 23, 2000, both of which are incorporated herein by this reference.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a*' can also be performed at an earlier stage in the graphics pipeline 180 depending on the rendering mode currently in effect (e.g., z compares can be performed earlier if alpha blending is not required). The pixel engine 700 includes a copy operation 700*c* that periodically writes on-chip frame buffer 702 to main memory 112 for access by display/video interface unit 164. This copy operation 700*c* can also be used to copy embedded frame buffer 702 contents to textures in the main memory 112 for dynamic texture synthesis effects. Antialiasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102. A copy-out pipeline that may be part of pixel engine 700 permits, within a single rendering pass, some or all of embedded frame buffer 702 to be copied out into main memory 112 as a texture. Texture unit 500 may then read the copied-out texture into texture memory 502 for use in texture mapping additional visualization into the frame buffer contents. It is possible for system 50 to copy out, for example, alpha information rendered into embedded frame buffer 702 and apply this alpha information as a texture for texture mapping to add to the contents of the embedded frame buffer—all within the same rendering pass. See U.S. patent application Ser. No. 09/722,663 entitled "Graphics System With Copy-Out Conversions Between Embedded Frame Buffer And Main Memory", and its corresponding provisional application Ser. No. 60/227,030, filed Aug. 23, 2000, both of which are incorporated herein by this reference.

Logical Combination of N Alpha Comparisons

As described in copending application Ser. No. 09/722,367 of Drebin et al entitled "Recirculating Shade Tree Blender For a Graphics System" (the entire disclosure of which including the drawings of which is incorporated herein by reference), the example embodiment recirculating shader 602 (see FIGS. 6–12*b*) supports different alpha functions including a logical combination of plural alpha test results within a single rendering pass. In the example embodiment, the alpha function compares the source alpha with a reference alpha using any one of the following operations:

always,
never,
not equal,
equal,
less,
greater than or equal,
less than or equal,
greater than.

The two functions are combined in the example embodiment using:

AND,
OR,
XOR,
XNOR.

If all of the valid pixels in a pixel quad fail the alpha test, the quad is discarded and the frame buffer 702 is thus not updated. Note that in the example embodiment, the alpha compare operation is not part of the recirculation stage, but rather, is performed after recirculation is complete—although the comparator 674 (which is part of the recirculating logic) can be used to perform alpha channel comparisons. The following are some examples of what can be implemented:

Example 1

*Asrc>Aref0 AND Asrc<Aref1*

Example 2

*Asrc>Aref0 OR Asrc<Aref1*

Example 3

*Asrc>Aref OR Asrc <–Aref*

The alpha functionality of recirculating shader 602 (e.g., in combination with the non-recirculating alpha compare) can thus be used to provide a transparency tree analogous to a shade tree. In particular, recirculating shader 602's alpha functionality can be used to provide N logical alpha operations on M alpha inputs, where N and M can be any integers. The combination of alpha compares and alpha logical operations can be used, for example, to provide non-photorealistic effects such as cartoon outlining.

Example Cartoon Outlining Technique

Figure 14:
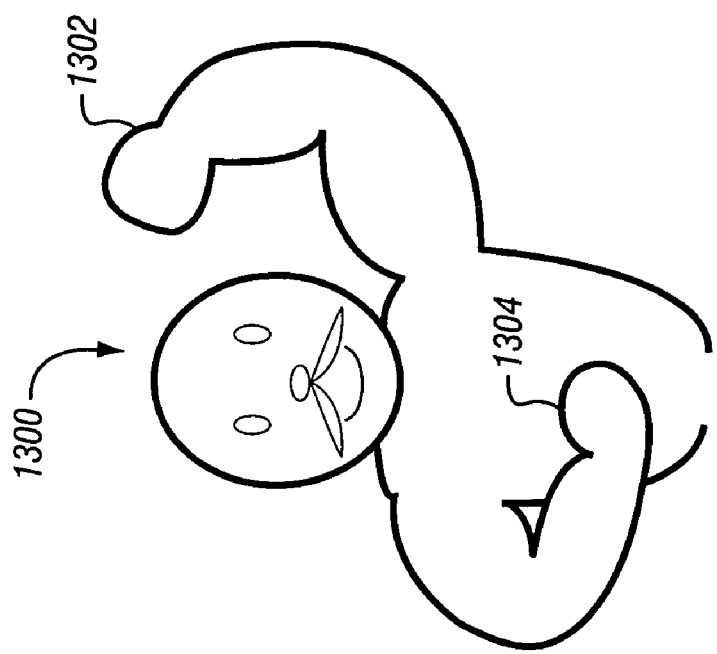
Figure 13:
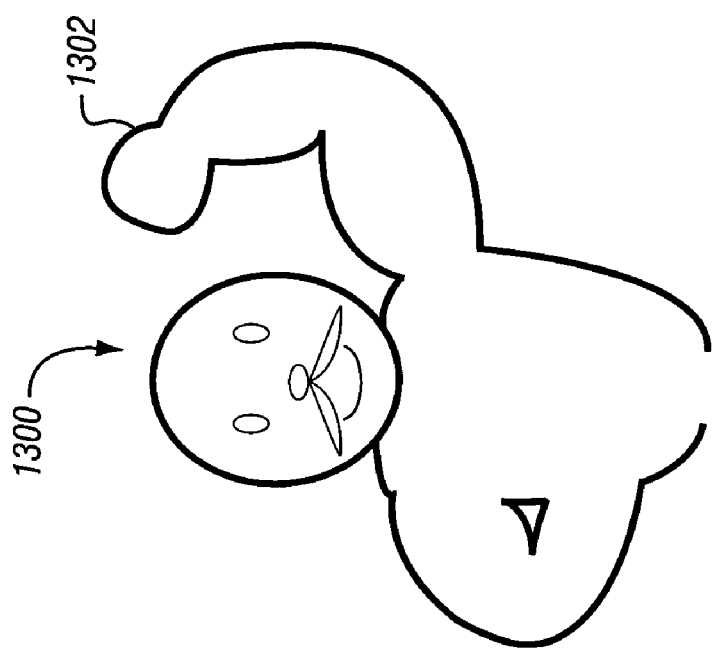

FIGS. 13 and 14 show that it may be desirable to apply border lines or outlines to cartoon characters. The FIG. 13 example cartoon character 1300 has border lines applied to silhouette edge(s) 1302. The outlining applied to silhouette edges 1302 provide a "cartoon outlining" effect that increases the clarity of the image and simulates hand-drawn cartoon or comic book type images.

FIG. 13 shows this cartoon character 1300 as also having a right hand, wrist, and portion of forearm being held in front of the character. A cartoon artist would apply border lines also to edges surrounding the right hand, wrist and forearm portion—even though in the particular character position shown, these are internal edges rather than silhouette edges. FIG. 13 illustrates that portions of the cartoon character 1300 may disappear or become less distinct if cartoon outlining is applied only to silhouette edge(s) 1302 of the character—whereas the viewer would (from experience with coloring books, hand-drawn animated cartoons, and/or comic books) expect a border line to also be applied to demarcate the hand, wrist and forearm.

To make cartoon character 1300 appear as if it were hand-drawn, it would be helpful to apply border lines to silhouette edges as well as to certain internal edges 304— i.e., those internal edges in this example that define the character's hand, wrist and portion of forearm that the character is holding in front of himself. FIG. 14 shows character 1300 with a border line applied to these internal edges 304. These internal edges 304 would be silhouette edges if the character 1300 was holding its arm in an outstretched position, but are internal edges in the arm orientation shown in FIG. 14.

A way to solve this problem is to assign different ID values to different objects or portions of an object, and to keep track of which pixels represent different objects or portions of an object by associating the ID values with the pixels during a rendering process. Such identification values can be assigned, as one example, by allocating bits within frame buffer 702 that are normally used to encode Alpha information. The assigned identification values may be used to determine whether or not to draw a border line at that pixel location. For example, the system may compare the identification value of a pixel to the identification value of a nearby (e.g., adjacent) pixel. If the identification values of two adjacent pixels have a certain predetermined relationship, then no border line is drawn. If the identification values are the same, then the two pixels are on the same surface and no border line is drawn. If the identification values of two adjacent pixels have a certain other predetermined relationship indicating an overlap of different objects or different portions of an object, then a border line is drawn.

Figure 15A:
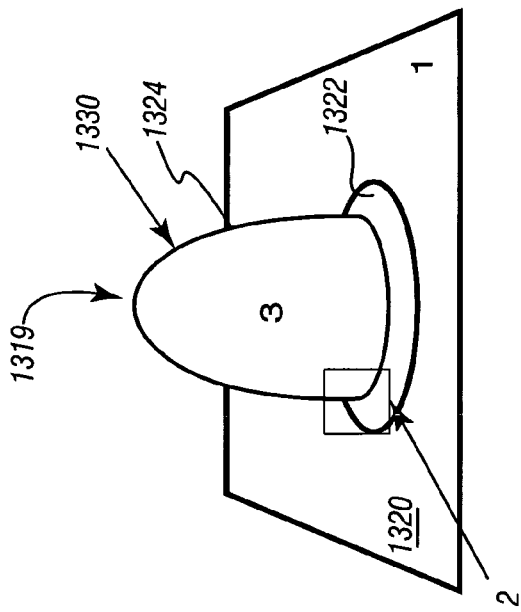
Figure 15B:
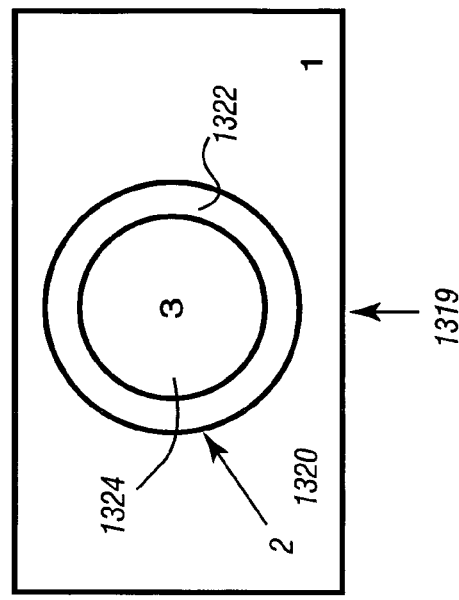
Figure 15C:
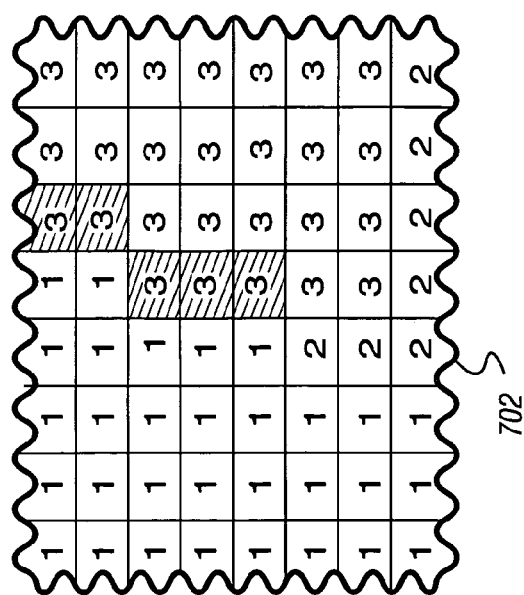

FIGS. 15A–15C illustrate an example. FIG. 15A shows a perspective view of an object 1319 comprising three object portions 1320, 1322, 1324. FIG. 15B shows a plan view of the same object 1319. Object portion 1320 is a square, object portion 1322 is a circle, and object portion 1324 is a cone. Suppose the graphics artist wants to draw a border line 330

(see FIG. 15A) where cone 1324 visually meets square 1320, but not where the cone meets circle 1322 or where the circle meets the square.

In this example, pixels within square 1320, circle 1322 and cone 1324 are coded with different respective identification values. By way of example, pixels within square 1320 can be coded with an identification value of "1"; pixels within circle 1322 can be coded with "2"; and pixels within cone 1324 can be coded with "3". FIG. 15C shows an example Alpha portion of frame buffer 702 storing the coded information, The shaded cells indicate those cells to which a border line color may be applied, based on a difference of 2 (or more) between neighboring alpha/id values.

During a pixel post-processing phase after an alpha and color image has been rendered into the frame buffer 702, the various identification values within the frame buffer can be tested. No border line is drawn for pixels having the same identification value as adjacent pixels (all such pixels are on the same surface). Also, no border line is drawn if a pixel has an identification value that differs by a predetermined criteria or set of criteria from the identification value of adjacent pixels (e.g., if the identification value of pixel k differs by less than 2 from the identification value of pixel k+1, then no border line is drawn). However, a border line is drawn if a pixel has an identification value that differs by a further predetermined criteria or set of criteria from the identification value of adjacent pixels (e.g., if the identification value of pixel k differs by 2 or more from the identification value of pixel k+1, then a border line may be drawn at pixel k).

Figure 16:
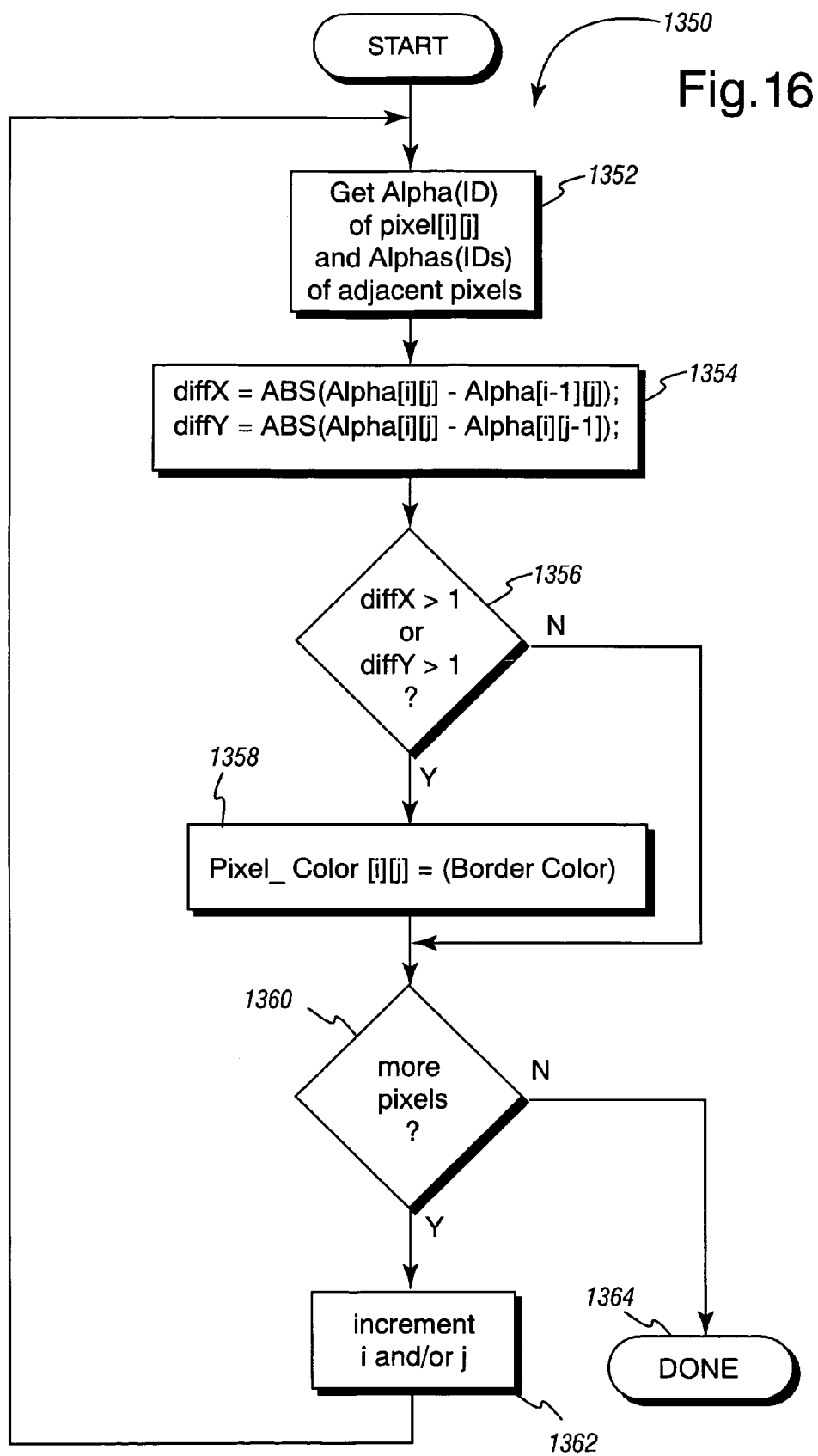

FIG. 16 is a flowchart of an example pixel post-processing routine 1350 for drawing border lines. Routine 1350 includes a loop (blocks 1352–1362) that is performed for each pixel[i][j] in an image stored in frame buffer 702. As discussed above, the image generation process may, as part of rendering the image into the frame buffer, set identification values for each distinct part of an object in frame buffer bits normally allocated for storing Alpha values. Routine 1350 tests these Alpha (now ID) values to determine whether or not to draw border lines. In this example, routine 1350 retrieves the Alpha (ID) value of pixel[i][j] as well as the Alpha (ID) values of adjacent pixels (i.e., pixel[i−1][j] and pixel[i][j−1]) (block 1352). Routine 1352 then performs (at block 1354) the following calculation to determine the difference between the Alpha (ID) value of pixel[i][j] and the Alpha (ID) value(s) of adjacent pixels:

$$diffX=ABS(Alpha[i][j]-Alpha[i-1][j])$$

$$diffX=ABS(Alpha[i][j]-Alpha[i][j-1]).$$

Routine 1350 then tests the resulting calculated difference values diffX and diffY to determine if either exceeds a predetermined difference (e.g., an arbitrary fixed or programmable threshold such as 1) (block 1356). If at least one of the difference values exceeds the predetermined difference, then routine 1350 sets the color of pixel[i][j] to the border line color (block 1358). Thus, when alpha slope is −1 to +1, pixels are considered to be on the same surface in this particular example. Steps 1352–1358 are repeated for each pixel in the image (blocks 1360, 1362).

In one variation of routine 1350, certain objects can be coded with a special Alpha identification value (e.g., 0x00) to specify that the pixels within the object are to be ignored for the purpose of drawing border lines (see FIG. 16A). This could be useful, for example, to render a non-border-lined object as a bit map (e.g., for explosion animation).

FIG. 17 shows how routine 1350 described above can be applied to efficiently draw border lines on object 1300 shown in FIGS. 13 and 14. In this example, different parts of object 1300 are coded with different Alpha (ID) values. For example, object 1300 may include two arms 1311a, 1311b and a torso 1309. Each arm may comprise a hand 1313, a wrist portion 1315, a lower arm portion 1312, an elbow portion 1308, an upper arm portion 1310, and a shoulder portion 1317. Each of these various portions can be coded with a different Alpha ID as follows:

| Body Part | Alpha ID |
|---|---|
| left hand 1313a | 1 |
| left wrist 1315a | 2 |
| left lower arm 1312a | 3 |
| left elbow 1308a | 4 |
| left upper arm 1310a | 5 |
| left shoulder 1317a | 6 |
| torso 1309 | 7 |
| right shoulder 1317b | 8 |
| right upper arm 1310b | 9 |
| right elbow 1311b | 10 |
| right lower arm 1312b | 11 |
| right wrist 1315b | 12 |
| right hand 1313b | 13 |

With the example Alpha ID coding above, routine 1350 will draw border lines as shown with dark lines in FIG. 17, but will not draw border lines at the other (dotted line) intersections between objection portions.

Figure 18C:
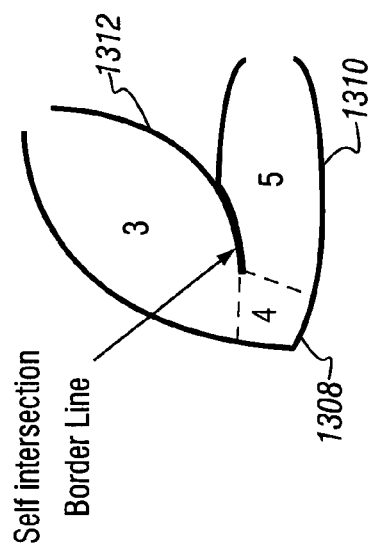
Figure 18B:
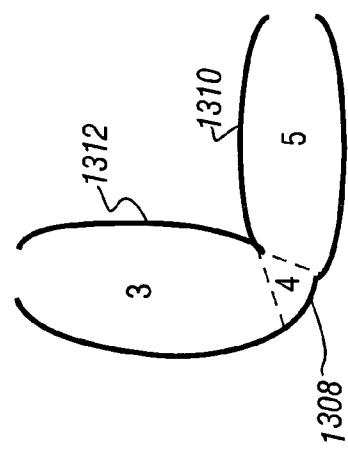
Figure 18A:
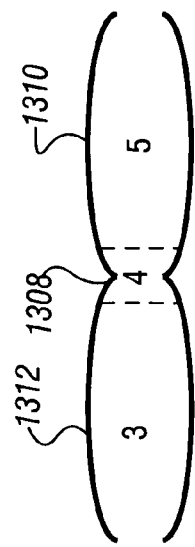

The coding above can also be used to apply a border line to intersections between connected portions of the same object 1300. Conventional coloring books, hand-drawn animated cartoons and the like sometimes apply cartoon outlining to such self-intersections in order to give greater definition to the articulated joint, create the illusion of muscle development, and the like. For example, FIGS. 18A–18C show a close-up of the articulated joint 1308 (i.e., elbow) of character 1300 joining the character's upper arm 1310 with forearm 1312. Using the coding described above, when the articulated joint 1308 is bent so that appendages 1310, 1312 are oriented adjacent to (e.g., in contact with) one another as illustrated in FIGS. 18B and 18C, routine 1350 will (based on the difference between Alpha ID of lower arm 1310 and Alpha ID of upper arm 1312 being greater than one) apply a border line segment 1316 to the intersection of body segments 1310, 1312 intersect.

Example Cartoon Outlining Process Implemented On System 50

FIG. 19 shows an example high-level flowchart of how system 50 can be used to provide cartoon outlining, and FIG. 20 shows an example of how system 50 can be configured to implement a cartoon outlining pipeline.

Referring to FIG. 19, to perform cartoon outline imaging or other similar effects, the application sets up frame buffer 702 to include an alpha channel (block 1400). See U.S. patent application Ser. No. 09/722,380 entitled "Embedded DRAM Frame Buffer With Reconfigurable Pixel Format", and its corresponding provisional application Ser. No. 60/226,910, filed Aug. 23, 2000, both of which are incorporated herein by this reference. System 50 then is controlled to draw a scene into frame buffer 702 (block 1402). During this operation, however, object identifiers that may be provided by main processor 110 as part of per-vertex information, for example, are written into the alpha channel of system 50 for storage into the alpha locations within frame buffer 702.

Some attention to detail should be used when assigning IDs to surfaces. The example embodiment alpha channel is limited to eight bits, so it is possible that IDs may need to be reused if there are more than 256 different objects in a scene. In one example implementation, only seven bits of alpha are available, with the eighth bit being used as a sign bit for the threshold operation. This is acceptable so long as different objects with identical IDs do not overlap. If silhouettes are desired on overlapping sections of concave objects, a more complex ID and threshold system can be used. One way to implement this is to assign IDs that vary by one to different parts of the same object, with a total difference of at least two for possibly overlapping sections. The threshold function then only needs to create silhouettes for differences of at least two. See FIG. 16 above. Of course, different implementations will have different limitations, and these particular arrangements are illustrative only.

Once the desired portion of the image has been rendered into frame buffer 702, pixel engine 700 is controlled to copy the alpha image of the frame buffer to a texture in the external frame buffer or other buffer (block 1404; see FIG. 13). Such copy out can be into IA8 texture format, for example. Appropriate precautions are taken to ensure synchronization and memory coherence. See the synchronization token technique described in U.S. patent application Ser. No. 09/726,227 entitled "Dynamically Reconfiguring of Hidden Surface Processing Based on Rendering Mode", and its corresponding provisional application, Ser. No. 60/226,890, filed Aug. 23, 2000, both of which are incorporated herein by this reference.

Once the alpha texture has been successfully copied out of the internal frame buffer and then read into texture memory 502 (see FIG. 13), system 50 configures the graphics processor 114 to write outline color to pixels within frame buffer 702 based on differences between neighboring pixel alphas (block 1406). See FIG. 16 above. Such a draw cartoon outline operation may, for example, involve reading out pixel alpha values, modifying those alpha values, and then writing back alpha as a blend parameter. Neighboring alpha values can be looked up from the alpha texture using one set of texture coordinates and two different texture matrices. One matrix can be set to the identity matrix, while the other is set to the identity matrix plus a translation. The blend test/comparison can be implemented using two general alpha compare functions combined with a third logical operation such as OR or AND. This allows us to do inside-outside range testing instead of just greater/less than.

In more detail, to perform the difference computation (e.g., the absolute value of $[a_0 - a_1]$ where $a_0$ is the alpha value for a given pixel and $a_1$ is the alpha value for a neighboring pixel), texture environment unit 600 can be set up to subtract one alpha value from the other and to write the unclamped result to the texture environment unit output register. The alpha compare or other value comparator within texture environment unit 600 can be set up to detect alpha values that exceed the threshold, i.e.:

*alpha=texture1−texture 2*

*acomp1=alpha<−X*

*acomp2=alpha>X*

*killpixel=acomp1 OR acomp2.*

In one particular implementation, unclamped negative results from texture environment unit 600 may turn into alpha values with the most significant bit set. Thus, for an alpha difference threshold of 2, the application can write the outline color to pixels with an alpha difference greater than 1 and smaller than (max−2) where max might equal 255. Texture environment unit 600 can be set up to blend in a color value from a register based upon the results of the comparison. Main processor 110 can set this color value register to any desired value (e.g., black for a black outlining effect, blue for a blue outlining effect, etc.).

In one particular example, writing outlines can be performed in two recirculation passes of recirculating shader within texture environment unit 600. In the first pass (block 1408), horizontal outlining is drawn into frame buffer 702 based on a texture coordinate transformation matrix multiplication performed by transform unit 300 that is set up to shift the alpha texture image one pixel (texel) vertically. In a second pass (block 1410) used for writing vertical outlines, the texture matrix can be modified to shift the alpha image one pixel (texel) horizontally. Thicker outlines can be achieved by making the shifts larger than one pixel, but visual anomalies may result if the outlines are made too thick.

Once both horizontal and vertical outlines have been written into frame buffer 702, the frame buffer can be copied out for display (block 1412).

EXAMPLE

The following shows an example set of application programming interface calls that can be used to control system 50 to perform cartoon outlining:

| Function | Parameters | Description |
|---|---|---|
| GXSetTexCopySrc | xOrig, yOrig, width, height | 0, 0, SCREEN_WD, SCREEN_HT |
| GXCopyTex | copy buffer | referred by GXLoadTexObjPreLoaded |
|  | texture format | GX_TF_IA8 |
|  | mipmap filter | GX_DISABLE |
|  | clear on copy | GX_DISABLE |
| GXLoadTexObjPreLoaded | texture map ID | GX_TEXMAP0 |
|  | texture object ptr | defined by GXInitTexObj/TexObjLOD |
|  | texture region ptr | defined by GXInitTexRegion |
| GXInitTexObj | texture object ptr | for output |
|  | pointer for bitmap | outputted by GXCopyTex |
|  | width | SCREEN_WD |
|  | height | SCREEN_HT |
|  | texture format | GX_TF_IA8 |
|  | clamp_s, clamp_t | GX_CLAMP, GX_CLAMP |
|  | mipmap enable | GX_DISABLE |
| GXInitTexObjLOD | texture object ptr | same as GXInitTexObj's |
|  | min_filter | GX_NEAREST |
|  | max_filter | GX_NEAREST |
|  | min_lod, max_lod, lod_bias |  0.0f, 0.0f, 0.0f (don't care) |
|  | bias_clamp, do_edge_lod | GX_DISABLE, GX_DISABLE (don't care) |
|  | max_aniso | GX_ANISO_1 (don't care) |

-continued

| Function | Parameters | Description |
|---|---|---|
| GXInitTexPreloadRegion | texture_region | for output |
| | tmem_even | 0 |
| | size_even | 0 (don't care) |
| | tmem_odd | 0 (don't care) |
| | size_odd | 0 (don't care) |

Texture Environment
Blend/Alpha Compare commands
((See "Recirculating Shade Tree Blender For A Graphics System" referenced above.)

GXSetTexCopySrc
  Description
  This function sets the source parameters for the Embedded Frame Buffer (EFB) to texture image copy. This feature is useful when creating textures using the Graphics Processor (GP).
  The GP will copy textures into the tiled texture format specified in GXCopyTex. The GP always copies tiles (32B) so image widths and heights that are not a multiple of the tile width will be padded with undefined data in the copied image. Also, the allocated image size in main memory must be a multiple of 32 B, see GXGetTexBufferSize.
  Arguments
left left most source pixel to copy, multiple of 2 pixels.
top top most source line to copy, multiple of 2 lines.
wd width to copy, multiple of 2 pixels.
ht height to copy, multiple of 2 lines.

GXCopyTex
  Description
  This function copies the Embedded Frame Buffer (EFB) to a texture image buffer, dest, in main memory. This is useful when creating textures using the Graphics Processor (GP). If the clear flag is GX_TRUE, the EFB will be cleared to the current clear color (see GXSetCopyClear) during the copy operation. The source image is described by GXSetTexCopySrc. The EFB is converted to the texture format during the copy. The texture format and an optional box filter enable are set using GXSetTexCopyDst.
  The allocated buffer is padded to texture tiles (32 B/tile) in X and Y. The function GXGetTexBufferSize is provided to determine the padded size.
  The clear flag indicates the frame buffer should be cleared during the copy operation. The frame buffer is cleared to the constant values specified by GXSetCopyClear.
  Arguments
dest Pointer to texture image buffer in main memory. This pointer should be 32 B aligned.
clear If this flag is GX_TRUE the framebuffer should be cleared during the copy.

GXLoadTexObjPreLoaded
  Description
  This function loads the state describing a preloaded texture into one of eight hardware register sets. Before this happens, the texture object, obj, should be initialized using GXInitTexObj or GXInitTexObjCI. The id parameter refers to the texture state register set. The texture should be loaded beforehand using GXPreLoadEntireTexture.
  Once loaded, the texture can be used in any Texture Environment (Tev) stage using the GXSetTevOrder function. GXInit initially calls GXSetTevOrder to make a simple texture pipeline that associates GX_TEXMAP0 with GX_TEVSTAGE0, GX_TEXMAP1 with GX_TEVSTAGE1, etc.
  Note that GXLoadTexObjPreLoaded will not call the functions set by GXSetTexRegionCallBack (and GXSetTlutRegionCallBack if the texture is color index format) because the region is set explicitly. However, these callback functions must be aware of all regions that are preloaded. The default callbacks set by GXInit assume there are no preloaded regions.
  Arguments
obj Points to a texture object which describes the texture and its properties.
region Points to a region object which describes an area of texture memory.
id Names the texture for reference in a texture environment (Tev) stage.

GXInitTexObj
  Description
  This function is used to initialize or change a texture object for non-color index textures. Texture objects are used to describe all the parameters associated with a texture, including size, format, wrap modes, filter modes, etc. It is the application's responsibility to provide memory for a texture object. Once initialized, a texture object can be associated with one of eight active texture IDs using GXLoadTexObj.
  To initialize a texture object for color index format textures, use GXInitTexObjCI.
  If the mipmap flag is GX_TRUE, then the texture is a mipmap and the texture will be trilerped. If the mipmap flag is GX_FALSE, the texture is not a mipmap and the texture will be bilerped. To override the filter modes and other mipmap controls, see GXInitTexObjLOD.
  Arguments

| Arguments | |
|---|---|
| obj | Pointer to a texture object. |
| image_ptr | Pointer to the image data for a texture, aligned to 32B. |
| width | Width of the texture or LOD 0 for mipmaps. Max value is 1024. Mipmaps must be a power of two. |
| height | Height of the texture or LOD 0 for mipmaps. Max value is 1024. Mipmaps must be a power of two. |
| format | Texel format. |
| wrap_s | Describes how texture coordinates will be wrapped in the s direction. Accepted values are: GX_CLAMP, GX_REPEAT, GX_MIRROR. |
| wrap_t | Describes how texture coordinates will be wrapped in the t direction. Accepted values are: GX_CLAMP, GX_REPEAT, GX_MIRROR. |
| mipmap | If mipmap = GX_TRUE, the texture is a mipmap and will have trilinear filtering; otherwise, it is not a mipmap and will use bilinear filtering. |

GXInitTexObjLOD

| C Specification |
|---|
| # include <dolphin/gx.h> |
| void GXInitTexObjLOD( |
|     GXTexObj*               obj, |
|     GXTexFilter           min_filt, |
|     GXTexFilter           mag_filt, |
|     f32                       min_lod, |
|     f32                       max_lod, |

-continued

| C Specification | |
|---|---|
| f32 | lod_bias, |
| GXBool | bias_clamp, |
| GXBool | do_edge_lod, |
| GXAnisotropy | max_aniso ); |

Description

This function sets texture Level Of Detail (LOD) controls explicitly for a texture object. It is the application's responsibility to provide memory for a texture object. When initializing a texture object using GXInitTexObj or GXInitTexObjCI, this information is set to default values based on the mipmap flag. This function allows the programmer to override those defaults. Note that this function should be called after GXInitTexObj or GXInitTexObjCI for a particular texture object.

The LOD computed by the graphics hardware can be biased using the lod_bias parameter. The lod_bias is added to the computed lod and the result is clamped between min_lod and max_lod. If bias_clamp is enabled, the effect of lod_bias will diminish as the polygon becomes more perpendicular to the view direction. This prevents over-sharpening the texture in this situation, but allows LOD biasing for oblique polygons.

| Arguments | |
|---|---|
| obj | Pointer to a texture object. |
| min_filt | Filter mode to use when the texel/pixel ratio is >= 1.0. Accepted values: GX_NEAR, GX_LINEAR, GX_NEAR_MIP_NEAR, GX_LIN_MIP_NEAR, GX_NEAR_MIP_LIN, GX_LIN_MIP_LIN. |
| mag_filt | Filter mode to use when the texel/pixel ratio is < 1.0. Accepted values are: GX_NEAR, GX_LINEAR. |
| min_lod | Minimum LOD value. The hardware will use MAX(min_lod, lod). Range is 0.0 to 10.0. |
| max_lod | Maximum LOD value. The hardware will use MIN(max_lod, lod). Range is 0.0 to 10.0. |
| lod_bias | Bias to add to computed LOD value. |
| bias_clamp | If GX_ENABLE, clamp the (LOD + lod_bias) so that it is never less than the minimum extent of the pixel projected in texture space. Prevents over-biasing the LOD when the polygon is perpendicular to the view direction. |
| do_edge_lod | Compute LOD using adjacent texels when GX_TRUE, else use diagonal texels. |
| max_aniso | The maximum anisotropic filter to use. |

GXInitTexPreLoadRegion

Description

This function initializes a Texture Memory (TMEM) region object for preloading. The region is allocated in TMEM by the application and can be used only as a pre-loaded buffer. Cache regions must be allocated by using GXInitTexCacheRegion. For pre-loaded textures, the size of the region must match the size of the texture. An application can create many region objects and some of them can overlap; however, no two overlapping regions can be active at the same time.

The maximum size of a region is 512K.

GXInit creates no region for preloading. So the application should allocate appropriate regions if preloading is necessary. It is also required to create cache regions and its allocator by using GXInitTexCacheRegion and GXSetTexRegionCallBack because new regions may destroy the default texture memory configuration.

| Arguments | |
|---|---|
| region | Pointer to a GXTexRegion structure. The memory for this structure must be allocated by the application. |
| tmem_even | Base pointer in Texture Memory for even LODs of a mipmap. Must be in the opposite bank relative to tmem_odd and aligned to 32 bytes. |
| size_even | Size of the the even cache in bytes. The size should be a multiple of 32B (OSAlloc allocates memory in 32B chunks). |
| tmem_odd | Base pointer in Texture Memory for the odd LODs of a mipmap. Must be in the opposite bank relative to tmem_even and aligned to 32 bytes. |
| size_odd | .Size of the the odd cache in bytes. The size should be a multiple of 32B (OSAlloc allocates memory in 32B chunks). |

Example Software Controlled Process that Implements Cartoon Outlining

The following program fragment can be used to control the graphics pipeline to provide a cartoon outlining effect:

```
//------------------------------------------------------------------------
// Cartoon outline settings
//------------------------------------------------------------------------
#define  ASFT(x)    ((x) <<2)   // ID step size ( 6bit alpha )
#ifdef   EPPC
#define  GXInitTexRegionPreLoaded( region, is_32b_mipmap, tmem_even, tmem_odd )\
         GXInitTexRegion(   (region), GX_FALSE, (is_32b_mipmap), \
                            (tmem_even), 0, 0, (tmem_odd), 0, 0 )
// If exFB can be usable, Use exFB instead of this buffer
u16         alphaBuffer[SCREEN_WD*SCREEN_HT] ATTRIBUTE_ALIGN(32);
GXTexObj    eFBTexObj;
GXTexRegion eFBTexRegion;
```

```
-continued
/*---------------------------------------------------------------------
 *
 *   Draw Cartoon outline for HW
 *---------------------------------------------------------------------
 */
void    DrawCartoonOutline( void )
{
    static s32 initialized = 0;
    //   CopyOut eFB as IA8 texture format
    GXSetTexCopySrc( 0, 0, SCREEN_WD, SCREEN_HT );
    GXCopyTex( alphaBuffer, GX_TF_IA8, GX_DISABLE, GX_DISABLE );
    //   Load the bitmap into TMEM
    if ( !initialized )
    {
        GXInitTexObj(   &eFBTexObj, alphaBuffer, SCREEN_WD, SCREEN_HT,
                        GX_TF_IA8, GX_CLAMP, GX_CLAMP, GX_DISABLE );
        GXInitTexObjLOD(   &eFBTexObj, GX_NEAR, GX_NEAR, 0.0f, 0.0f, 0.0f,
                           GX_DISABLE, GX_DISABLE, GX_ANISO_1 );
        GXInitTexRegionPreLoaded(   &eFBTexRegion, GX_FALSE, 0, 0 );
        initialized = 1;
    }
    GXLoadTexObjPreLoaded(   &eFBTexObj, &eFBTexRegion, GX_TEXMAP0 );
    return;
}
#else
u8   alphaBuffer[SCREEN_WD*SCREEN_HT];
/*---------------------------------------------------------------------
 *
 *   Draw Cartoon outline for OpenGL
 *---------------------------------------------------------------------
 */
void    DrawCartoonOutline( void )
{
    u32     i;
    u8      a00, a01, a10, d01, d10;
    // Read out pixel alpha
    glReadPixels(   0, 0, SCREEN_WD, SCREEN_HT,
                    GL_ALPHA, GL_UNSIGNED_BYTE, alphaBuffer );
    // Modify alpha
    for ( i = 0; i < SCREEN_WD*(SCREEN_HT-1); i ++ )
    {
        a01 = a00;
        a00 = alphaBuffer[i];
        a10 = alphaBuffer[i+SCREEN_WD];
        d01 = (u8) (a01 - a00 + ASFT(1));
        d10 = (u8) (a10 - a00 + ASFT(1));
        if ( d01 > ASFT(2) || d10 > ASFT(2) )      alphaBuffer[i] = 0x00;
        else                                        alphaBuffer[i] = 0xff;
    }
    // Write back alpha as blend parameter
    glBlendFunc  ( GL_ZERO, GL_SRC_ALPHA );
    glAlphaFunc  ( GL_ALWAYS, 0.0f );
    glViewport   ( 0, 0, SCREEN_WD, SCREEN_HT );
    glScissor    ( 0, 0, SCREEN_WD, SCREEN_HT );
    glDrawPixels     ( SCREEN_WD, SCREEN_HT,
                       GL_ALPHA, GL_UNSIGNED_BYTE, alphaBuffer );
    return;
}
#endif
```

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 21A:
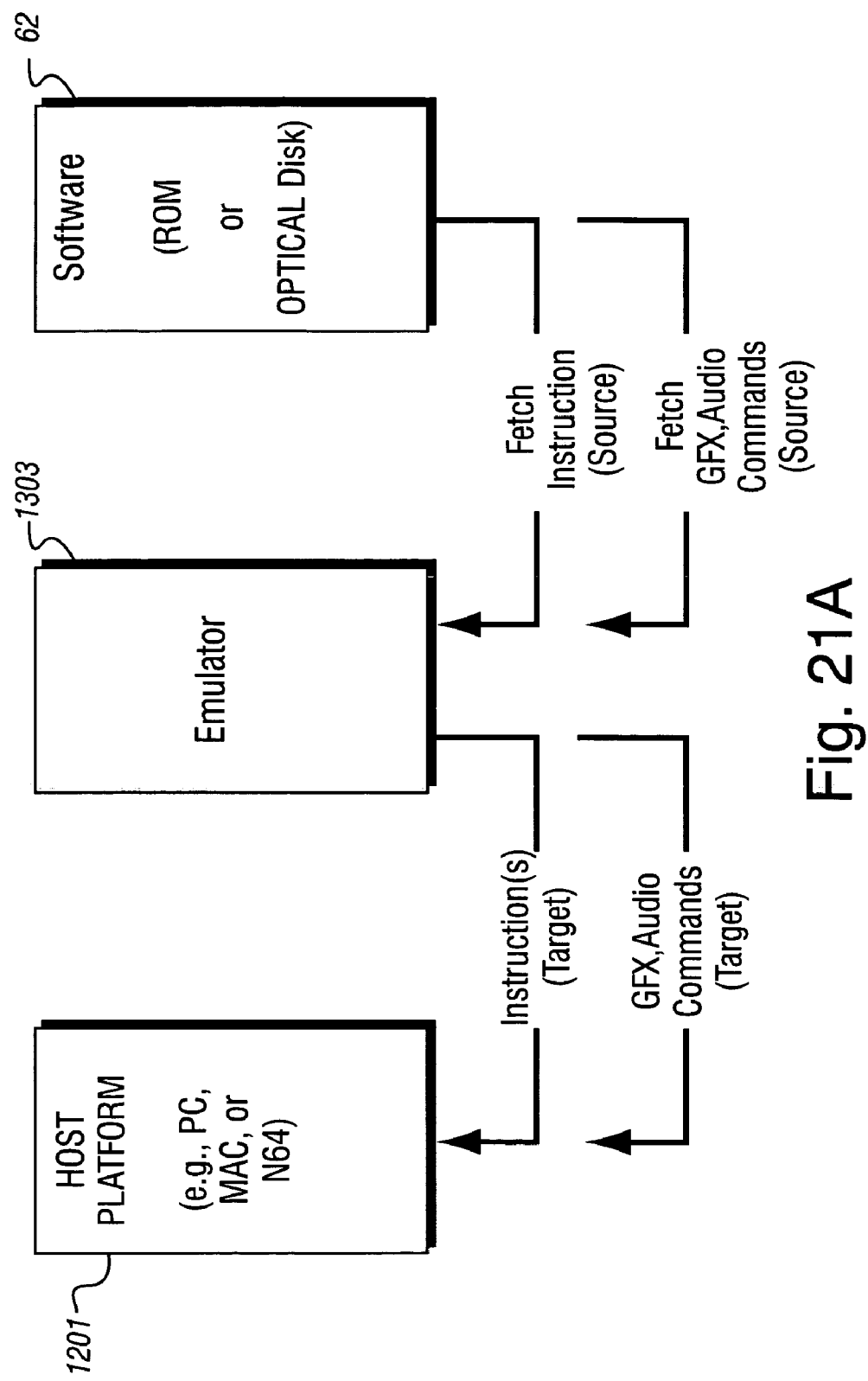
FIGS. 21A and 21B show example alternative compatible implementations.

FIG. 21A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 or other platform implementing the FIG. 19 outlining process might not have a recirculating shader, but might instead implement the alpha compare operation using a pipeline of discrete shading/blending stages. Similarly, an alternative implementation might not store alpha and color information in the same frame buffer, but might instead store this information in different frame buffers. For example, the alpha "image" providing object Ids might be stored as a map in main memory. Post processing need not be performed through use of texturing, but could be performed instead by a general purpose processor. Rendering outlines in two passes might not be needed; some implementations might render both horizontal and vertical outlines in the same pass.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 21B:
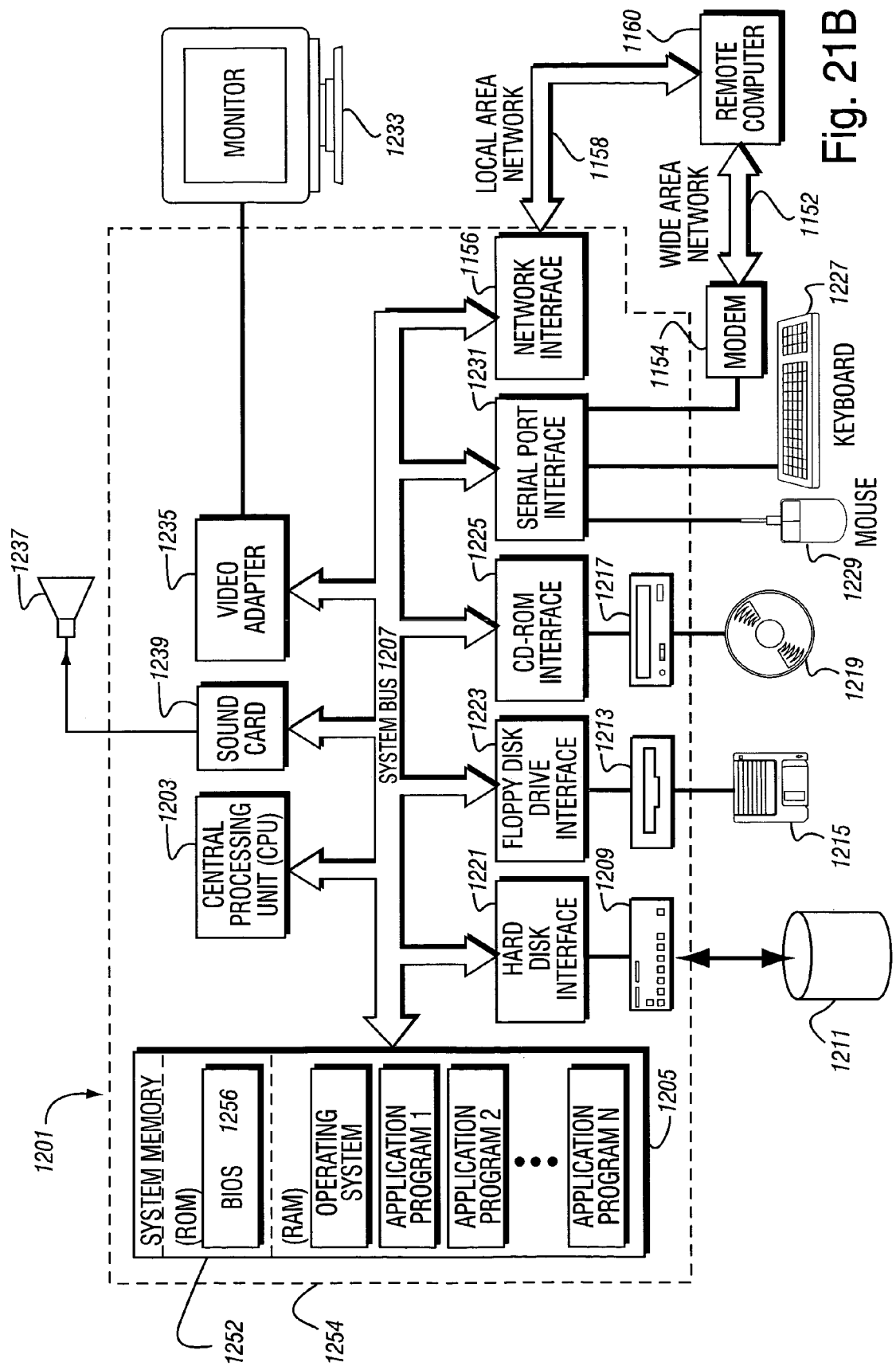

FIG. 21B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

The entire contents of all patents, patent applications and other documents referenced above are expressly incorporated herein.

While the invention has been described in connection with what is presently considered to be the most practical and preferred embodiment, it is to be understood that the invention is not to be limited to the disclosed embodiment. For example, although the object of the illustrated embodiment is to provide images with cartoon outlining, the flexible alpha compare operation described herein can be used for a number of different imaging applications. Furthermore, while dual alpha comparisons are described above, the present invention is not limited to just two alpha comparisons. Additionally, while the preferred embodiment uses a recirculating shader, a parallel arrangement having plural alpha comparators could be used. Accordingly, the invention is intended to cover various modifications and equivalent arrangements included within the scope of the appended claims.

We claim:

1. A method of generating a graphics image comprising:
   (a) generating information representing a surface to be imaged, said information including alpha transparency/opacity information;
   (b) performing, at least in part within a recirculating, hardware-based graphics generator, plural alpha comparisons on said alpha information to provide corresponding plural alpha comparison results;
   (c) logically combining said plural alpha comparison results; and
   (d) rendering said graphics image based at least in part on said logical combination,
   wherein said steps (b) and (c) use said recirculating, hardware-based graphics generator to process a programmable alpha tree by providing N logical alpha operations on M alpha inputs, M and N being any integers, M>1, N>1.

2. The method of claim 1 wherein said rendering step includes selecting whether or not to kill a pixel based on said logical combination.

3. The method of claim 1 wherein said performing step is performed using a recirculating shader.

4. The method of claim 1 wherein both said performing and said logically combining steps are performed at least in part by hardware.

5. The method of claim 1 wherein said rendering step includes selectively determining whether to blend a cartoon outline color based on said logical combination.

6. The method of claim 1 wherein said steps (b) and (c) implement an absolute value function.

7. The method of claim 1 wherein said plural alpha comparisons include any selected ones of the following:
   always,
   never,
   not equal,
   equal,
   less than,
   greater than or equal,
   less than or equal,
   greater than.

8. The method of claim 1 wherein said logical combining includes AND, OR, XOR, XNOR.

9. In a home video game system or low cost personal computer graphics card, a hardware-based transparency processor including:
   an alpha combiner stage that combines at least first and second alpha input values to generate an alpha result;
   an alpha comparator/tester that compares or tests the alpha result; and
   a recirculator at least in part responsive to said alpha comparator/tester, said recirculator selectively recirculating said alpha result as at least one of said alpha input values,
   whereby said transparency processor processes programmable, arbitrarily complex alpha trees; wherein said alpha trees have arbitrary complexity comprising N logical operations on M alpha inputs, M and N being any integers, M>1, N>1.

10. The transparency processor of claim 9 wherein said recirculator selectively recirculates said alpha result conditioned on said alpha comparison or test said alpha comparator/tester performs on said alpha result.

* * * * *